United States Patent [19]
Kaplan et al.

[11] Patent Number: 5,488,569
[45] Date of Patent: Jan. 30, 1996

[54] APPLICATION-ORIENTED TELECOMMUNICATION SYSTEM INTERFACE

[75] Inventors: Marc P. Kaplan, Aberdeen; Hui-Lan Lu, Marlboro; Lev Slutsman, Wayside, all of N.J.

[73] Assignee: AT&T Corp., Murray Hill, N.J.

[21] Appl. No.: 170,139

[22] Filed: Dec. 20, 1993

[51] Int. Cl.⁶ .................................................. G06F 15/00
[52] U.S. Cl. ........................ 364/514 R; 370/62; 379/201
[58] Field of Search ............................. 364/280.4, 274.8, 364/275, 275.5, 514, 514 R; 395/12, 146, 147, 161, 375, 650; 370/62, 94.3; 379/201, 243, 34

[56] References Cited

U.S. PATENT DOCUMENTS

| | | | |
|---|---|---|---|
| 4,667,290 | 5/1987 | Goss et al. | |
| 5,005,119 | 4/1991 | Rumbaugh et al. | 395/650 |
| 5,321,800 | 6/1994 | Lesser | 395/161 |

OTHER PUBLICATIONS

SEBESTA, "Concepts of Programming Languages", 1993 (No month) pp. 100, 102, 103, 145.

Aho, A. V., Sethi, R. and Ullman, J. D., *Compilers: Principles, Techniques, and Tools,* Addison–Wesley, Mar. 1988, pp. 40–43.

Esaki, S., Uchida, N., and Omiya, T., "Service Logic Execution of IN in Multi–vendor Environment–Introduction of SLP Execution Processor," Proceedings of the International Council For Computer Intelligent Networks Conference, May 4–6, 1992, pp. 441–450.

Mizuno, O., Niitsu, Y., and Okamoto, M., "Service Specification Description and Service Logic Program Generation for Intelligent Networks, <SDL, PARAD>," Proceedings of the International Council for Computer Communication Intelligent Networks Conference, May 4–6, 1992, pp. 430–440.

Morgan, M. J., Cosky, M. J., Gruenenfelder, T. M., Holmes, T. C. Jr., and Raack, G. A., "Service Creation Technologies for the Intelligent Network," AT&T Technical Journal, Summer 1991, vol. 70, Nos. 3–4, pp. 58–71.

Singh, D. and Garrison, D. R., "Requirements for Sevice Creation Platforms in an Open System Environment," Proceedings of the International Council for Computer Communication Intelligent Networks Conference, May 4–6, 1992, pp. 162–174.

Steel, T. B., Jr., "A First Version of UNCOL," Proceedings of the Western Joint Computer Conference, May 9–11, 1961, pp. 371–378.

Tanenbaum, A., Van Staveren, Hans, Keizer, E. G., and Stevenson, Johan W., "A Practical Tool Kit for Making Portable Compilers," Communications of the ACM, vol. 26, No. 9, Sep. 1983, pp. 654–660.

Williams, T., "Optimizing Compilers Improve RISC Performance," Computer Design, Jan. 1993, pp. 120–121.

Wyatt, G. Y., Barshefsky, A., Epley, R. V., Kaplan, M. P., and Krishnan, K. P., "The Evolution of Global Intelligent Network Architecture," The AT&T Technical Journal, Summer 1991, vol. 70, No. 5, pp. 11–25.

(List continued on next page.)

*Primary Examiner*—Ellis B. Ramirez
*Assistant Examiner*—Thomas Peeso

[57] ABSTRACT

The present invention provides a method and apparatus for interfacing different service creation environments (SCEs) and execution environments (EEs) in a telecommunication system. A telecommunication system interface in accordance with the present invention includes at least one SCE to be interfaced to a plurality of service EEs; a parser for parsing output code from the SCE to form a parse tree representing a telecommunication service developed in the SCE; an intermediate code generator for generating an intermediate code representing nodes of the parse tree such that the intermediate code preserves substantially all the information contained within the SCE output code; and a target code generator for generating a target code for each of the EEs from the intermediate code, such that the telecommunication service developed in the SCE may be provided in each of the EEs.

20 Claims, 10 Drawing Sheets

OTHER PUBLICATIONS

CCITT Blue Book, vol. X, Fascicle X.1, "Funtional Specification and Description Language," Recommendation Z.100 and Annexes A,B,C & E, Recommendation Z.110, Melbourne, Nove. 14∝25, 1988.

CCITT Draft Recommendation 1.312/Q.1201, "Principles of Intelligent Network Architecture," Geneva, Mar. 10–17, 1992.

CCITT Recommendation Q.1205, "Intelligent Network Physical Plane Architecture," Geneva, Mar. 10–17, 1992.

CCITT Draft Recommendation Q.1290, "Glossary of Terms Used in the Definition of Intelligent Networks," Geneva, Mar. 10–17, 1992.

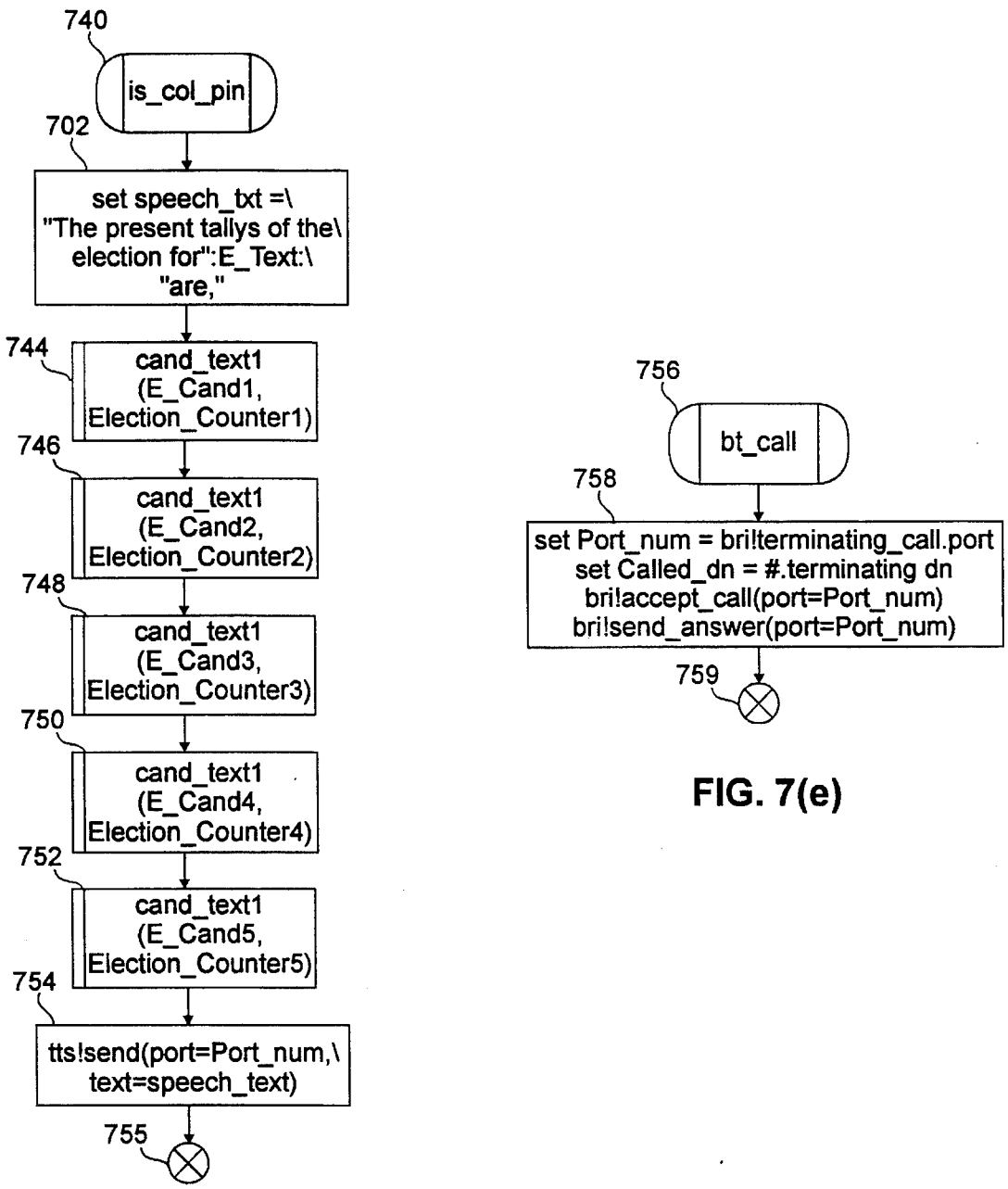

APPLICATION-ORIENTED TELECOMMUNICATION SYSTEM INTERFACE

BACKGROUND OF THE INVENTION

1. Field of the Invention

The present invention relates generally to techniques for integrating different telecommunication systems and services. More particularly, the present invention relates to a standard interface which permits telecommunication services created in one Service Creation Environment (SCE) to be used in a number of different Execution Environments (EEs).

2. Description of Prior Art

Telecommunication services may be provided by executing machine-level code in telecommunication hardware such as telephone network switches and computers. The telecommunication hardware which executes the machine-level code may be more generally referred to as an Execution Environment (EE). The EEs may serve to, for example, route data packets in a data communication network or direct calls in a telephone network switching system. A group of EEs can provide interactive services to network users, and transmit data, documents and video through the network. Exemplary EEs include Service Switching Processors (SSPs), Service Nodes (SNs), Intelligent Peripherals (IPs) and Service Control Points (SCPs), all of which may be elements of an Intelligent Network (IN) architecture. Further detail regarding INs can be found in, for example, O. Mizuno et al., "Service Specification Description and Service Logic Program Generation for Intelligent Networks", Proc. of the International Council for Computer Communication Intelligent Networks Conference, May 4–6, 1992, pp. 430–440, which is incorporated by reference herein.

Under current practice, the telecommunication services provided in each EE are typically programmed using a specific development tool in a high-level programming environment. The high-level programming environment may be more generally referred to as a Service Creation Environment (SCE). Exemplary development tools include decision graph editors, spreadsheets, computer-aided systems engineering (CASE) tools, and Finite State Machine (FSM) editors. One exemplary type of FSM editor uses the standard CCITT Service specification Description Language (SDL), which represents telecommunications services in a graphical format to facilitate service development. The service to be provided in each EE is generally developed using a dedicated SCE, which runs on a computer workstation and provides a set of service development tools based upon a particular user paradigm. The SCE typically produces a service description file in a proprietary format developed by the SCE vendor. The proprietary service description file is then translated into a lower-level code suitable for directing an EE to provide the desired service, and therefore can usually only be used with a corresponding EE from the same or a related vendor.

The close coupling between SCEs and EEs under current practice presents a number of problems. One problem is that network services developed in one SCE can typically be used only in a corresponding EE and cannot be reused in different EEs. Another related problem is that the SCEs and EEs of one vendor generally cannot be interfaced to those of other vendors. In order to provide an interface between currently existing network services and a number of different EEs, it may therefore be necessary to redesign existing services to incorporate the interface. As a result of these problems, network providers, such as Local Exchange Carriers (LECs), long-distance carriers and foreign Postal, Telephone and Telegraph companies (PTTs), may have difficulty supplying telecommunication services in a timely and reliable manner. These problems are described in, for example, D. Singh and D. Garrison, "Requirements for Service Creation Platforms in an Open Systems Environment", Proc. of the International Council for Computer Communication Intelligent Networks Conference, May 4–6, 1992, pp. 162–174, which is incorporated by reference herein.

Several different approaches to the SCE-EE interface problem have been identified. One possible approach involves using a universal application-oriented language (UAOL) to program services in all SCEs. A related approach could involve using a standardized service execution processor (SEP). An exemplary standard SEP is disclosed in S. Esaki et al., "Service Logic Execution of IN Multi-vendor Environment—Introduction of SLP Execution Processor", Proc. of the International Council for Computer Communication Intelligent Networks Conference, May 4–6, 1992, pp. 441–450, which is incorporated by reference herein. Although either of these approaches may have been feasible if the telecommunication industry had initially settled upon a standard UAOL or SEP, no such standards are currently in widespread use. In addition, a UAOL capable of accommodating multiple service applications will generally be a complex high-level language, and will therefore not be easy to use. Implementing either the UAOL or standard SEP approaches at the present time would probably require redesign of existing network services programmed using non-standard languages or processors.

An alternative interface may translate object code between different SCEs and EEs. Object code translation typically involves translating source object code into a generalized assembly language, and then generating target object code from the assembly language. Object code translation has the advantages of being generally transparent to service users and an efficient means for generating the lower-level code required in a particular EE. However, this approach is inflexible to changes in service applications, and may not be well suited to programs which utilize run-time interpretation.

A technique presently used in prior art telecommunication system interfaces is cross-compilation. In general, cross-compilation involves designing a different compiler for translating code between each SCE and each EE. By using separate compilers for each interface, the services developed in any SCE may be used on any other EE, and therefore many of the above-noted problems are avoided. However, this approach may be prohibitively expensive in applications which include a large number of SCEs and EEs. The compiler development cost is generally a quadratic function of the number of SCEs and EEs. For example, if a telecommunication system includes m SCEs and n EEs, the cross-compilation approach will generally require the development and support of m×n compilers. An interface technique currently used in the context of higher-level programming languages is based on a common intermediate language. This approach was used in 1961 to develop a Universal Computer Oriented Language (UNCOL). See T. Steel, "A First Version of UNCOL", Proc. Western Joint Comp. Conf., pp. 371–377, 1961. Common intermediate languages typically include n front ends, each translating high-level code in one programming language to the intermediate language, and m back ends, each translating programs in the common intermediate language to a specific machine-level language, or target code. As a result, only n+m compilers must be written to interface each of the n SCEs to each of the m EEs, as opposed to n×m compilers in the cross-compilation approach. See, for example, A. Tanenbaum et al., "A Practical Toolkit For Making Portable Compilers", Communications of the ACM, Vol. 26, No. 9, September 1983 [hereinafter "Tanenbaum"]. A similar approach is utilized in U.S. Pat. No. 4,667,290, issued to Goss et al., entitled "Compilers Using A Universal Intermediate Language" [hereinafter "Goss"].

Existing common intermediate language techniques, however, suffer from a number of significant problems, and therefore have limited utility in telecommunication service applications. A major problem with the Tanenbaum approach is the loss of original input information when the interface input code is translated to an intermediate language. The original input information is lost because Tanenbaum uses an intermediate language which is basically an assembly language for a simple stack machine. The Goss patent is primarily directed to interfacing high-level programming languages, of a strongly-typed or procedural form, to different data processors. Goss uses a "quad", with four operative fields, as the basic code structure for the intermediate language. See Goss, col.5, line 60 to col.6, line 38. This inflexible structure may not adequately represent certain SCE outputs, such as non-procedural types of programming code. In addition, the intermediate language in Goss is designed for use with top-down parsing of the high-level programming language code. See Goss, col.5, lines 34–36. The Goss approach therefore may not be well-suited for generating intermediate code to represent typical SCE output code. For example, the Goss intermediate code generated from an SCE output code may not preserve enough SCE output code detail to permit efficient intermediate code optimization. The Goss patent thus does not suggest an appropriate intermediate language structure for use in interfacing, for example, SCEs and EEs in a telecommunication services context.

As is apparent from the above, a need exists for an efficient and flexible telecommunication system interface which permits services developed in different SCEs to be utilized in different EEs, without requiring a separate interface between each SCE and each EE, and without the problems of existing intermediate language techniques.

SUMMARY OF THE INVENTION

The present invention provides a method and apparatus for interfacing different SCEs and EEs in a telecommunication system. The method of the present invention includes the steps of defining a set of intermediate code operations suitable for representing telecommunication services developed in the selected SCEs; parsing output code from one of said selected SCEs to form a parse tree having a plurality of nodes, said parse tree representing one of the telecommunication services developed in the SCE; generating from the set of intermediate code operations and the parse tree an intermediate code representing the nodes of the parse tree, such that the intermediate code preserves substantially all information contained within the SCE output code; and generating from the intermediate code a target code for each of the EEs, such that the telecommunication services developed in the selected SCEs may be provided in each of the EEs.

In accordance with one aspect of the present invention, a telecommunication system interface is provided which includes at least one SCE to be interfaced to a plurality of service EEs; a parser for parsing output code from the SCE to form a parse tree representing a telecommunication service developed in the SCE; an intermediate code generator for generating an intermediate code representing nodes of the parse tree such that substantially all the information contained within the SCE output code is preserved in the intermediate code; and a target code generator for generating a target code for each of the EEs from the intermediate code, such that the telecommunication service developed in the SCE may be provided in each of the EEs.

In accordance with another aspect of the present invention, the intermediate code may preserve substantially all the information contained in the SCE output code by using a single line of intermediate code, referred to herein as a tuple, to represent each node of the SCE output code parse tree. The telecommunication system interface of the present invention thus includes an intermediate language which is capable of representing, for example, both statement and declaration nodes of an SCE output code parse tree, and therefore provides sufficient information for generating an optimized intermediate code.

As a feature of the present invention, telecommunication services developed in a particular SCE may be utilized in a variety of different EEs. The close coupling between SCEs and EEs is eliminated, and it is therefore no longer necessary to design a separate interface between each SCE and EE. Service interface design, operation and maintenance costs become a linear function of the number of SCEs and EEs, rather than a quadratic function as in the currently used cross-compilation approach.

As another feature of the present invention, the system interface provided does not place operational constraints on the SCE, and does not utilize a proprietary format, so SCE and EE selection is made vendor-independent. The interface permits a vendor to design a single service which may be utilized in parallel on a number of different EEs, and allows a vendor to efficiently maintain and update their services.

As an additional feature of the present invention, an interface is provided which permits reuse of currently existing services on different EEs, without redesigning or otherwise altering the existing services. The intermediate code may be designed to accommodate a number of currently-used SCE output languages. A service repository may then be maintained such that it is no longer necessary to redesign services when, for example, a different EE is developed.

As a further feature of the present invention, an application-oriented programming language (AOPL) is provided which includes an intermediate code structure well-suited to representing the output code of many different SCEs. The intermediate code structure in accordance with the present invention is based upon a flexible AOPL code line, referred to herein as a tuple, which has a variable number of fields. The structure is more flexible than, for example, the Goss quad structure, discussed above, which generally requires four fields. The tuple structure of the present invention is particularly well-suited to representing the parse trees of SCE output code, which may often be in a non-procedural type of programming language. The present invention thereby provides a number of advantages over existing intermediate language compilers, such as improved intermediate code optimization and more efficient target code generation for a wide variety of EEs.

The above-discussed features, as well as additional features and advantages of the present invention, will become more readily apparent by reference to the following detailed description and the accompanying drawings.

BRIEF DESCRIPTION OF THE DRAWINGS

FIGS. 5, 6a–c, 7a–7e and 8a–8d illustrate the SDL graphical notation for an exemplary televoting service application, which may be interfaced to a variety of different EEs in accordance with the present invention.

DETAILED DESCRIPTION

The present invention provides a method and apparatus for interfacing different SCEs and EEs in a telecommunication system. Although the following description illustrates the use of the telecommunication system interface in the context of specific SCEs and EEs, it should be understood that the present invention may also be utilized in a wide variety of other telecommunication system applications. Furthermore, although a number of simple programming language examples are used herein for illustrative purposes, it should be understood that the present invention is particularly well-suited for telecommunication system applications.

Figure 1:
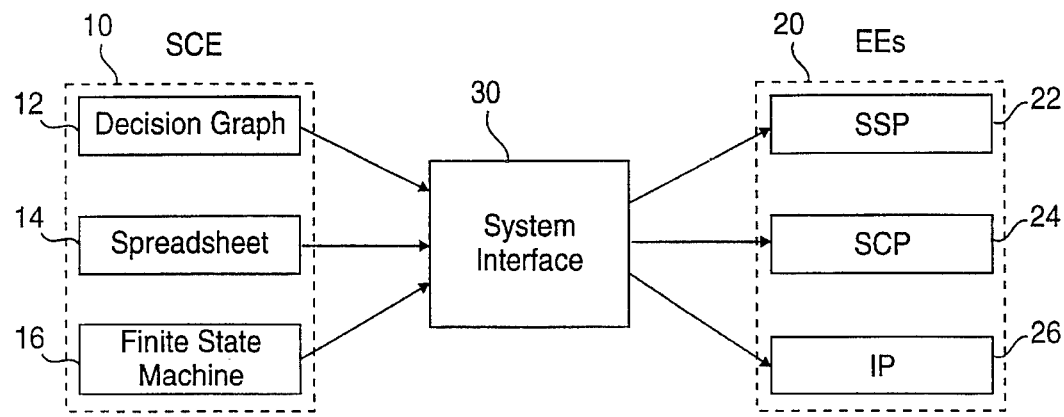
FIG. 1 is an exemplary block diagram of a telecommunication system in accordance with the present invention.

FIG. 1 shows a block diagram of a telecommunication system in accordance with the present invention. The exemplary system includes a Service Creation Environment (SCE) 10 with a number of different development tools. The exemplary development tools in SCE 10 include a decision graph editor 12, a spreadsheet tool 14, and a Finite State Machine (FSM) editor 16. The decision graph editor and FSM editor may be referred to more generally as graphical editors. The SCE may also include other types of development tools, such as Computer-Aided Systems Engineering (CASE) tools. In general, each of the development tools 12, 14, 16 may be utilized by a different system vendor to develop telecommunication services. The telecommunication services developed in the SCE 10 using the different development tools are executed in a group 20 of different Execution Environments (EEs). The exemplary EEs in the EE group 20 include a service switching processor (SSP) 22, a service control processor (SCP) 24, and an intelligent peripheral (IP) 26. The SCP 24 will generally be accompanied with, or used in conjunction with, a service node (SN). The IP 26 may be, for example, a computer, a fax machine, a video terminal or a text-to-speech convertor. The EEs 22, 24, 26 are generally referred to as intelligent network (IN) elements. Additional detail regarding INs may be found in, for example, M. Morgan et al., "Service Creation Technologies for the Intelligent Network", AT&T Technical Journal, Vol. 70, Nos. 3–4, Summer 1991, and G. Wyatt et al., "The Evolution of Global Intelligent Network Architecture", AT&T Technical Journal, Vol. 70, No. 5, Summer 1991, both of which are incorporated by reference herein.

In prior art telecommunication systems, a separate interface is typically developed to integrate services developed using each development tool 12, 14, 16 in SCE 10 with each EE 22, 24, 26. For example, decision graph program 12 may be designed with an interface that allows it to operate only with SSP 22. It is not possible, under the current system interface approach, to use, for example, a decision graph program 12 from one telecommunication system vendor with an SCP 24 designed by another vendor. The present invention avoids these problems with the prior art implementations, in part by utilizing a system interface 30 which is based upon an application-orientated programming language (AOPL). The AOPL of the present invention has been structured in a manner which facilitates integration of services created using different SCE development tools with a variety of EEs. The term "AOPL" as used herein refers to a type of common intermediate code defined in a suitable manner to represent SCE output code parse trees.

Figure 2:
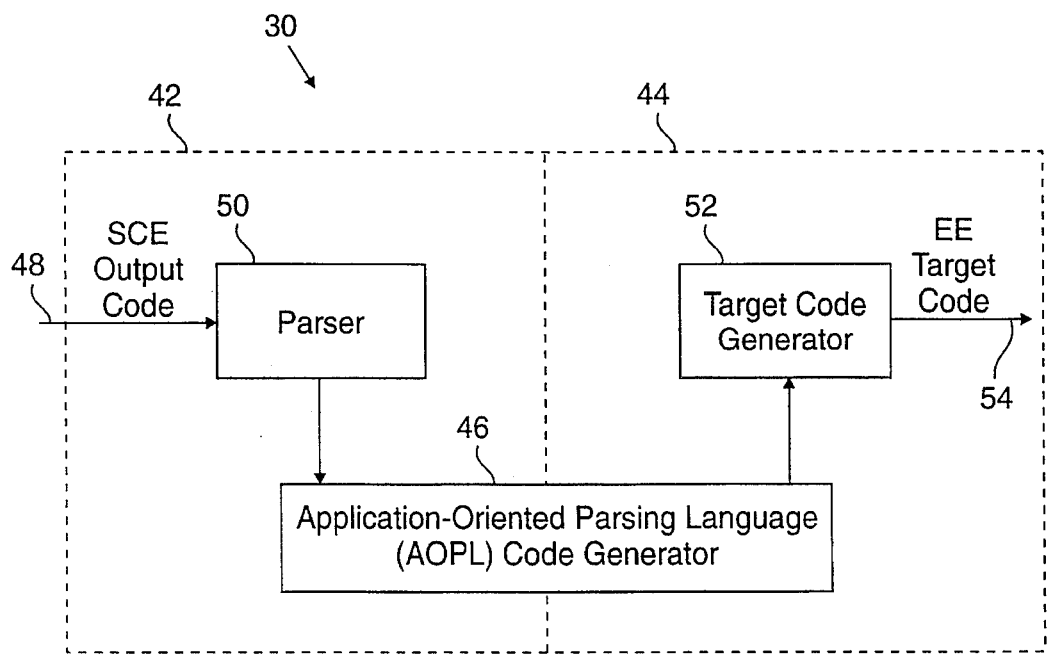
FIG. 2 is a more detailed block diagram of a telecommunication system interface in accordance with the present invention.

FIG. 2 is an exemplary embodiment of the telecommunication system interface 30 of the present invention. The interface 30 includes an SCE side 42 and an EE side 44, and is used to interconnect an SCE to one or more EEs. The SCE side 42 may represent, for example, the output of the decision graph program 12 shown in FIG. 1, while the EE side 44 may represent, for example, the input of the SSP 22. The decision graph program 12 may be also be referred to as a graphical user interface (GUI) within the SCE side 42. The SCE side 42 and the EE side 44 of the interface 30 are interconnected via a common intermediate language designated as AOPL 46. In general, the SCE side 42 may create a service description file in AOPL code based upon the SCE output code received on line 48 from an SCE. The translation from SCE output code to AOPL code is performed in a parser 50 which is present within the SCE side 42 of the interface 30. The parser 50 translates the high-level SCE output code of the decision graph program 12 into an appropriate AOPL code. The AOPL code is then transferred through the interface 30 to the EE side 44 of the interface. On the EE side 44, the AOPL code drives a code generator 52 which translates the AOPL code into a desired target code. The target code is then supplied via line 54 to an appropriate EE.

In general, a different parser 50 may be used to translate the operating code of a particular SCE into the common intermediate AOPL code. Similarly, a different code generator 52 may be used to receive the AOPL code and generate an appropriate target code for each EE. The SCE side 42 and EE side 44 of the interface 30 may therefore be implemented within the SCEs and EEs, rather than in, for example, an independent interface unit. For existing SCEs and EEs, however, it may be desirable to include the parsing and code generating functions within an independent interface unit. By using the system interface 30, services developed in SCE 10 using each of the development tools 12, 14, 16 may be interfaced to each of the EEs 22, 24, 26, as shown in FIG. 1. Furthermore, existing services which have been previously developed in a high-level language SCE, may be translated via parser 50, AOPL 46 and code generator 52, into a desired target code for a particular EE. In this manner, telecommunication services created in different SCEs may be reused in a variety of different EEs without redesigning the SCE. Existing telecommunication services, such as those already developed in a particular SCE for execution in a telephone network SSP or SCP, may be reused by simply translating the service description files for the particular SCE into AOPL code, using an appropriate parser 50. The AOPL 46 shown in FIG. 2 will be described below in greater detail.

The telecommunication system interface of the present invention uses an application-oriented intermediate language, AOPL, which has a structure particularly well-suited to certain telecommunication applications. In general, AOPL is a language designed for efficient depiction of SCE output code parse trees. Parsing of programming code to generate parse trees is well-known in the art, and described in, for example, pp. 40–42 of A. Aho et al., "Compilers: Principles, Techniques, and Tools", Addison-Wesley, March, 1988, which are incorporated by reference herein. The interface of the present invention uses an intermediate code structure which represents nodes of an SCE output code parse tree for a given telecommunication service. By representing the parse tree nodes, the intermediate code preserves substantially all the information within the SCE output code. The term "substantially all" in the context of SCE output code refers to information which is typically found in an output code parse tree, such as, for example, the structure, declarations, statements, and operations of the SCE output code.

A number of different SCEs may be selected for a given interface, and a set of intermediate code operations is then defined which is suitable for representing the telecommunication services developed in the selected environments. A substantial number of SCEs may be accommodated by defining an appropriate set of intermediate code operations. Several examples of intermediate code operations will be given below.

The AOPL of the present invention includes a general syntax, constructs, and design guidelines. Although the specific embodiment of AOPL used in a given application will typically vary depending upon the SCEs and EEs which are interfaced, the general structure of the language may be described as follows. An exemplary AOPL file generally includes a number of different code lines, referred to herein as tuples, which represent the parse trees of the SCE output code. Each AOPL tuple is delimited by a semicolon, and includes a number of different fields separated by commas. An exemplary AOPL tuple may include three fields, corresponding to the label, type, and operation of the tuple, respectively. The label field includes any sequence of printable characters other than commas or semicolons, and provides a convenient means for identifying a particular tuple. The type field, in accordance with the present invention, may be either P_node or S_node. The type field indicates the type of parse tree node which is represented by that particular tuple. Tuples of the P_node type may include declarations, expressions, and statements, while S_node type tuples generally include longer programming sequences, such as data structures. The operation field of the AOPL tuple includes an operator, which may indicate, for example, the operation performed at a node of the SCE output code parse tree. The operation field may also indicate a number of operands used in that operation. Exemplary AOPL operators include, for example, LEAF, VARREF, CONSTREF, and SEQUENCE.

An AOPL tuple may also include a number of additional fields. For example, the tuple may include an additional field for each operator identified in the operation field. These additional fields will be referred to herein as operand fields. The operand fields may be used to identify, by label, different tuples which correspond to, for example, other nodes in the SCE output code parse tree. The operand fields represent the other tuples which are operated on by the operator specified in the operator field. Other additional fields which may be included in a particular AOPL tuple are name and value attribute fields. The name attribute field generally includes a character string, which may correspond to a token in the SCE output code. The value attribute field will typically contain an integer value indicating, for example, the size or the address of the data which is operated on within the tuple.

The AOPL of the present invention recognizes three different kinds of tokens. Tokens are sequences of characters having a collective meaning in the SCE output code. The tokens recognized by AOPL include identifiers, literals and separators. An identifier may be an arbitrary sequence of letters, digits, and/or special characters. The first character of the identifier may be any character other than a digit. The operators used within the above-described operator fields are reserved as AOPL keywords and therefore may not be used as identifiers in the SCE output code. The literals may be one of two types, either character strings, also known as string-literals or integer literals. A third type of token recognized by the AOPL of the present invention is a separator. The separators may include certain predefined characters such as, for example, ";", ",", "(", and ")". AOPL identifies these tokens in the high-level language, or output code, of the SCE, and generates a parse tree which represents the functional interconnection of the tokens. Tokens are identified in the SCE output code by taking the longest string of characters associated with any particular token. Certain portions of the SCE output code, known as "white spaces", are not recognized as tokens. These white spaces include blanks, tabs, newlines, and formfeeds.

The above described AOPL grammar is summarized in the following language template:

```
<AOPL-program>: <AOPL-node> |
       <AOPL-program> <AOPL-node>
<AOPL-node>: <node-head> <node-tail>;
<node-head>: <label>, <node-type>, <opcode>, <node-list>
<label>: identifier
<node-type>: P_node |
       S_node
<opcode>: <AOPL_opcode> (integer-literal)
<AOPL_opcode>: keyword
<node-list>: <label> |
       <node-list>, <label>
<node-tail>: empty |
       <attribute-list>
<attribute-list>: <list-entry> |
       <attribute-list>, <list-entry>
<list-entry>: <name-attribute> |
       <value-attribute>
<name-attribute>: string-literal
<value-attribute>: integer-literal
```

In the above language template, the symbols "<>" surround certain elements of each exemplary tuple shown, and the symbol "¦" designates the logic "or" operator.

The AOPL of the present invention may be illustrated using a simple C program. It should again be emphasized, however, that the AOPL structure is particularly well-suited to telecommunication system applications, and the exemplary C programs used to illustrate AOPL herein are shown primarily for illustrative purposes. In this C language programming example, one of the development tools used in SCE 10 provides output code of the form shown below:

```
       main()
{
   int x;
   int Y;
   y = 2;
   x = y*y + 2;
   printf("%d", x);
}
```

Using the AOPL structure of the present invention, as described above, the exemplary C program shown above may be represented in an intermediate AOPL code as follows:

```
main, P_node, SEQUENCE(5), x_decl, y_decl, stm1, stm2, stm3;
x_decl, P_node, INTDECL(1), x_var;
x_var, P_node, VARREF(2), x_leaf, x_decl;
x_leaf, P_node, LEAF(1), int, 'x';
y_decl, P_node, INTDECL(1), y_var;
y_var, P_node, VARREF(2), y_leaf, y_decl;
y_leaf, P_node, LEAF(1), int, 'y';
stm1, P_node, ASSIGNMENT(2), y_var, 2_const;
2_const, P_node, CONSTREF(1), 2_leaf;
2_leaf, P_node, LEAF(1), int, '2';
stm2, P_node, ASSIGNMENT(2), x_var, r_stm2;
r_stm2, P_node, PLUS(2), expr1, 2_const;
expr1, P_node, MULT(2), y_var, y_var;
stm3, P_node, FUNCTION(2), printf, printf_arg;
printf, P_node, LEAF(1), int, 'printf';
printf_arg, P_node, ARG_LIST(2), arg1, x_var;
arg1, P_node, CONSTREF(1), %f_leaf;
%f_leaf, P_node, LEAF(1), string, '%d';
```

In the above AOPL code, the tuple "main" represents the root node of a parse tree of the exemplary C program. The AOPL code also includes a number of different operators, which are shown in capital letters. One exemplary operator is the SEQUENCE operator. The SEQUENCE operator directs the AOPL interface to generate sequential code for the five exemplary operands which follow it. As noted above, the operands following an AOPL operator also correspond to various nodes in a parse tree of the SCE output code. In the exemplary program shown, each of the operands of the sequence operator are either declarations or statements within the C program. Each of these operands therefore represent a node of the output code parse tree. Each will also correspond to a different tuple, or basic code line, within the intermediate AOPL code. The tuples which include operators of the form LEAF represent terminal nodes in the SCE output code parse tree, whose operands are predefined in a particular embodiment of the AOPL language. In the exemplary AOPL code shown, the predefined operands are shown in italics, and represent primitive data types, such as integers and strings. In general, the operators and predefined operands will vary depending upon the functionality of the SCEs and development tools used.

The above example utilizes only P_node-type tuples. A second exemplary C program, having an AOPL code representation which includes S_node-type tuples, is as follows:

```
struct date {
    int day;
    int month;
    int year;
} due_date;
```

Exemplary AOPL code corresponding to the second C program is shown below:

```
due_decl, P_node, RECDECL(1), due_var;
due_var, P_node, VARREF(2), due_leaf, due_decl;
due_leaf, P_node, LEAF(1), date_record, 'due_date';
date_record, S_node, RECORD(4), field1, field2, field3,
    date_leaf;
field1, P_node, RECFIELD(2), day_leaf, date_record;
day_leaf, P_node, LEAF(1), int, 'day', 4;
field2, P_node, RECFIELD(2), month_leaf, date_record;
month_leaf, P_node, LEAF(1), int, 'month', 4;
field3, P_node, RECFIELD(2), year_leaf, date_record;
year_leaf, P_node, LEAF(1), int, 'year', 4;
date_leaf, P_node, LEAF(1), date_record, 'date', 12;
```

In the above exemplary AOPL code, the operator RECORD specifies the name and size of the record itself, while the operator RECFIELD(2) indicates the name and type of each field in the record. The operands corresponding to the RECORD operator specify the record fields. Each of the terminal nodes, corresponding to operator LEAF, include a value attribute field which identifies the size of the terminal node.

Figure 3:
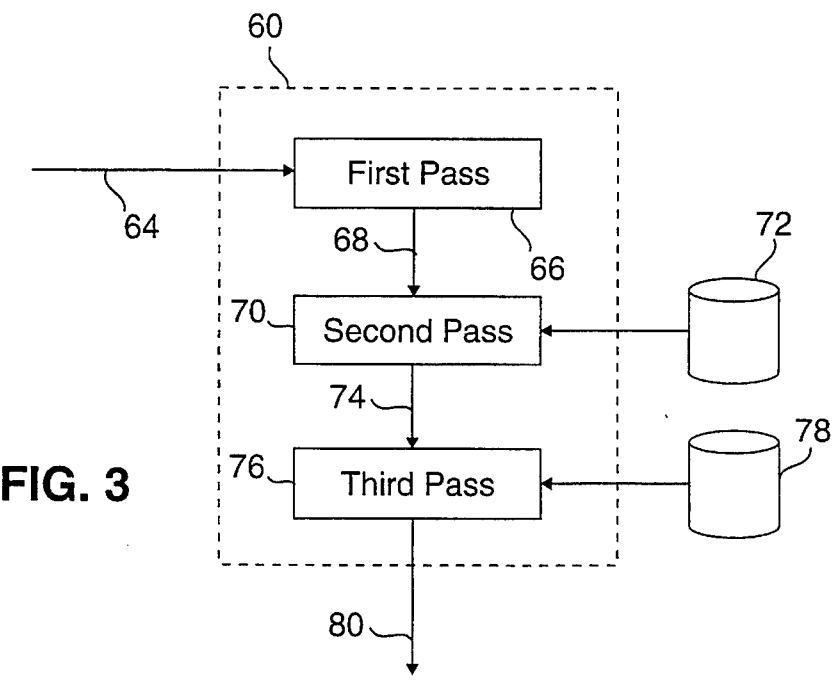
FIG. 3 is a block diagram illustrating an exemplary set of code processing steps within a telecommunication system interface in accordance with the present invention.

In order to efficiently construct AOPL code such as that shown above, the present invention may utilize a multi-level architecture, as shown in FIG. 3. The system interface 60 may be divided into several different code translation operations, or passes. Each pass may contain a distinct operation set for performing code translation. SCE output code, which may be, for example, from any of the development tools 12, 14, and 16, is provided on line 64. In a first pass 66, the SCE output code is translated into a first pass code which is supplied via output 68 to a second pass 70. The first pass 66 is used to translate the SCE output code from a particular SCE into a language which may be more readily converted into a common intermediate language. The operation set used within the first pass 66 may therefore be defined such that it closely reflects the characteristics of the SCE on which the SCE output code was created. It will then be easier to alter the interface to accommodate any changes in the SCE, and to identify and report errors at the SCE code level, prior to generating the common intermediate AOPL code. An exemplary first pass operation set will be shown below for an SDL representation of a televoting service application. The operation set used in first pass 66 may be stored within the service creation environment itself.

The second pass 70 receives the first pass code generated in the first pass 66 and generates second pass code in a common intermediate language which will be used for all of the SCEs. The second pass 70 will typically include an operation set which is broader and more generic than the operation set used in first pass 66. It will therefore be possible to introduce new operations in first pass 66 without affecting second pass 70. A second pass database 72 may contain, for example, second pass macros which may be used to expand certain nodes in the first pass code. The second pass 70 provides common intermediate AOPL code on output 74 which is then processed in a third pass 76. The third pass 76 is designed to simplify target code generation for each EE. The operation set defining a third pass code in general more closely reflects the attributes of a particular EE. In the third pass, a group of third pass macros stored in a third pass database 78 may be used to expand certain nodes in the second pass code. The resulting target code is supplied via line 80 to a particular EE such as, for example, an SCP or SSP within a telephone switching network. Although FIG. 3 illustrates an exemplary three-level hierarchy for implementing the interface 60, it should be understood that additional levels may be included within the interface to translate SCE output code to EE target code in a given application.

The three passes shown in FIG. 3 may be distributed across an SCE and an EE, with a first pass code generator in the SCE and a third pass code generator in the EE, such that the SCE generates, and the EE receives, the common intermediate code generated in second pass 70. The first pass 66 may thus be performed within each SCE, while the third pass 76 is performed within each EE. In order to generate the common intermediate code, an output portion of the SCE uses a first pass program and a predefined operation set. In the second pass, an intermediate code generator is used to generate and optimize a common intermediate code. Finally, an EE may receive the intermediate code and generate appropriate target code. Each pass typically involves translating the code of the prior pass into a more appropriate code. The first, second and third passes in the three-level hierarchy of FIG. 3 may therefore correspond to the operations performed by the parser 50, the AOPL code generator 46, and the target code generator 52, respectively, of FIG. 2. In some cases, it may not be necessary to perform translation at each pass. Instead, templates representing typical programming constructs such as "case" and "if" can be used for direct substitution. The stored operation sets in databases 72 and 78 may then include simple macros for translating nodes of the SCE output code parse tree from high-level SCE output code to low-level EE target code.

Figure 4:
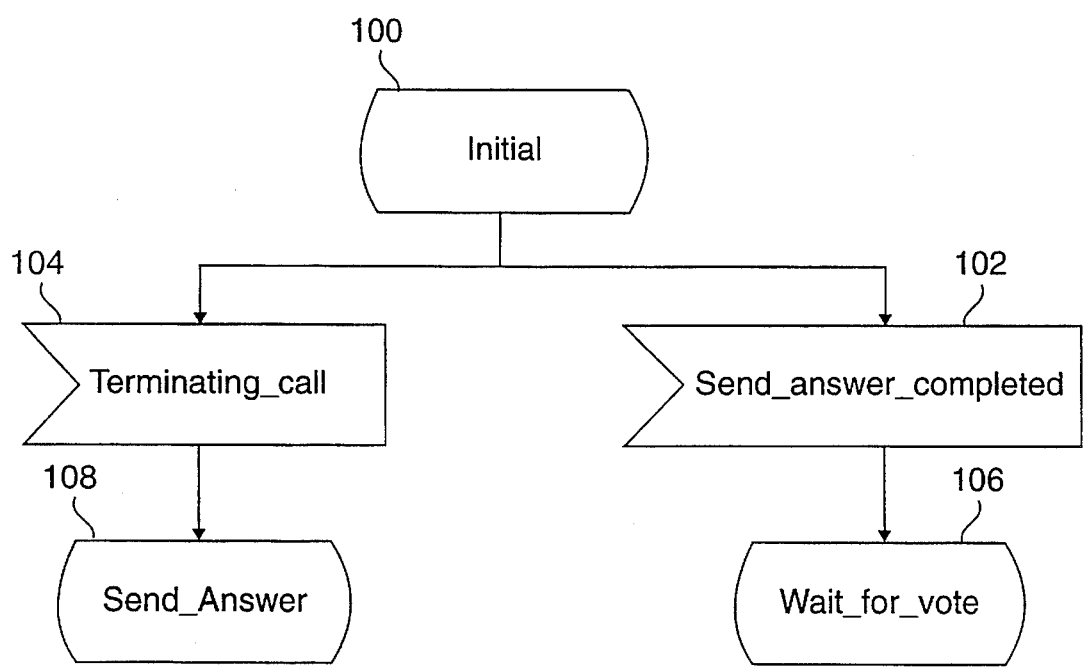
FIG. 4 is a flow diagram of a portion of an exemplary service application developed in the SDL graphical notation.

The telecommunication system interface of the present invention has been applied to a variety of different SCEs and EEs. FIG. 4 illustrates a flow diagram of an exemplary service state machine which uses the CCITT Service specification Description Language (SDL). The SDL language is referred to as SDL/GR when used in its graphical representation form and SDL/PR when used in its literal, or textual, representation form. Programs may be created in the SDL/PR form by using general-purpose text editors. SDL/GR programs, however, are typically developed using, for example, a graphical editor specifically designed for manipulating SDL/GR symbols. In FIGS. 4 through 8, the SDL/GR graphical notation is used. The SDL/GR graphical notation generally provides a means for representing telecommunication service functions in a graphical symbol format, and is described in more detail in, for example, CCITT Blue Book Vol. X, Fascicle X.1, "Fuctional Specification and Description Language," Recommendation Z.100 and Annexes A, B, C and E, and Recommendation Z.110, 1988, which are incorporated by reference herein. The SDL/GR graphical notation typically resembles a parse tree, and therefore can be readily described in terms of AOPL tuples. A symbol 100 is labeled "initial" and corresponds to an SDL STATE symbol which may be represented by a first tuple. The symbols 102, 104 are INPUT symbols within the SDL/GR graphical notation, and each may be represented by a different tuple. The symbols 106, 108 also represent STATE symbols in the SDL/GR graphical notation. The text within each of the STATE symbols 100, 106, 108 identifies a state, while the text within each of the INPUT symbols 102, 104 identifies an event. The SDL/GR graphical notation may be represented in the form of tuples such that each symbol within the notation may be associated with a unique AOPL operation whose operands reflect the connections to the symbol. The operations STATE and EVENT represent operations performed within the STATE and INPUT symbols, respectively. Each operator includes a number of operands corresponding to the outputs of each symbol. The exemplary SDL/GR notation shown in FIG. 4 may be translated in a first pass code generator into the following first pass code:

```
state, P_node, B_STATE(2), event1, event2, 'Initial';
event1, P_node, B_INPUT(1), state1, 'bri!terminating_call';
event2, P_node, B_INPUT(1), state2, 'bri!send_answer_
    completed';
state1, P_node, B_STATE(0), 'Send_Answer';
state2, P  node, B    STATE(0), 'Wait_For_Vote';
```

As noted above, the first pass code may be generated by parsing the high-level code at the output of the SCE. Alternatively, the first pass code may be generated using a parser within a system interface unit. A second pass is used to translate the above first pass code into the following common intermediate AOPL code which may be supplied to any of a number of different EEs:

```
state1, P_node, STATE(2), state1_leaf, event_list1;
state1_leaf, P_node, LEAF(1), state, 'Initial';
event_list1, P_node, SEQUENCE(2), event1, event2;
event1, P_node, EVENT(2), event1_var, handler1;
event1_var, P_node, VARREF(2), event1_leaf, event1_decl;
event1_leaf, P_node, LEAF(1), event1_record,
'bri!terminating_call';
handler1, P_node, NEXTSTATE(1), state2;
state2, P_node, STATE(2), state2_leaf, event_list2;
state2_leaf, P_node, LEAF(1), state, 'Send_Answer';
event2, P_node, EVENT(2), event2_var, handler2;
event2_var, P_node, VARREF(2), event2_leaf, event2_decl;
event2_leaf, P_node, LEAF(1), event2_record,
'bri!send_answer_completed';
handler2, P_node, NEXTSTATE(1), state3;
state3, P_node, STATE(2), state3_leaf, event_list3;
state3_leaf, P_node, LEAF(1), state, 'Wait_For_Vote';
```

The above second pass code, or intermediate AOPL code, is well-suited for representing services developed using a Service Logic Language (SLL). An SLL is an application-oriented language developed to describe telecommunication service applications in terms of interrelated FSMs. The different states of the SDL notation in FIG. 4 are represented by the operators STATE. The events corresponding to symbols 102, 104 are represented by the operation EVENT. In the STATE operators, a first operand identifies a LEAF node which specifies the name of that state, and a second operand identifies a list of event handlers, represented by a SEQUENCE node. The EVENT operators have a first operand which identifies a VARREF node, and a second operand which identifies the root of a particular subtree for an action within an event handler. The VARREF operator has the first operand which identifies a LEAF node specifying the name of the event, and a second operand which identifies a DEFEVENT node for declaring a particular event. It should be noted that the labels event_list2 and event_list3 are not specified in the above AOPL code because the states that they are associated with are only forward referenced but not defined in the exemplary fragment of SCE output code used in this example. The text within the symbols of FIG. 4 is shown for illustrative purposes, and does not correspond to a particular programming language. In general, any programming language syntax could be used for the text within the exemplary graphical symbols of FIG. 4.

In the above exemplary intermediate code, certain declaration and record nodes, such as those in event1_decl, event1_record, event2_decl and event2_record, are assumed to be predefined. It can be seen from the above example that additional code operations are present in the second pass code. The second pass code is more general and may be used to describe, for example, a variety of different FSMs. In contrast, the code generated by the first pass is more closely related to the SCE output code, and may not be suitable for representing code from other SCEs. The intermediate AOPL code shown above may be translated into the particular target code of a desired EE. Alternatively, a target code translation may not be necessary if, for example, the target code is sufficiently similar to SLL.

Another exemplary development tool used in many SCEs is a decision graph editor. Decision graph editors, like FSM editors, are a type of graphical editor used to depict the flows of various telecommunication services as an aid in service design and development. In general, the structure of a decision graph resembles that of a parse tree, and therefore each decision graph node may be efficiently represented by an AOPL tuple. A decision graph may include a variety of different decision graph nodes, corresponding to service operations and interconnected by branches. Each operation may also include a variety of suboperations, such as time, day, and percent for an exemplary operation referred to herein as DECISION. A first pass code for a percent suboperator node in a decision graph may be given by: percent-1, P_node, DECISION(2n), $val_1$, $br_1$, ... $val_n$, $br_n$, 'percent', in which n represents the number of branch outputs from the percent node. The code line also includes a pair of operands for each branch which specify the likelihood of branching from the percent decision graph node to one of the particular branches. A first pass code for the time suboperator node in a decision graph may be given by: time-1, P_node, DECISION(2n+1), $val_1$, $br_1$, ... $val_n$, $br_n$, value, 'time'. For the time node, the DECISION operator has an additional operand "value" which specifies a time after which a particular decision graph node will be connected to a particular branch. After a second pass, the above two exemplary lines of first pass code are expanded into the second pass code shown below. For the percent suboperator, the second pass may produce the following code:

```
percent-2, P_code, DGNODE(2), percent_call, br_list;
percent_call, P_code, FUNCTION(2), percent_leaf, arg_list;
percent_leaf, P_code, LEAF(1), int, 'percent';
arg_list, P_code, ARG_LIST(n), const_1, ..., const_n;
br_list, P_node, LIST(n), br_1, ..., br_n;
```

For the time suboperator, the second pass may produce the following code:

```
time-2, P_code, DGNODE(2), time_call, br_list;
time_call, P_code, FUNCTION(2), time_leaf, arg_list;
time_leaf, P_code, LEAF(1), int, 'time';
arg_list, P_code, ARG_LIST(n+1), const_1, ..., const_{n+1};
br_list, P_node, LIST(n), br_1, ..., br_n;
```

In another embodiment of the present invention, the system interface may generate target code which consists of assembly language for a particular EE. To simplify assembly code generation, the corresponding third pass operations may be chosen to include operands which are always predefined terminals of a given parse tree. As an example, a particular EE may include two-address instructions of the form:

operator source, destination

In instructions of this form, "operator" refers to an assembly language operator and "source" and "destination" represent operand fields. Exemplary assembly language operators include MOVE, MULT, and ADD. A target code may therefore be generated for the first exemplary C program shown above. The resulting third pass code, or target code, may be as shown below:

```
label1, P_node, move(2), y_leaf, register_leaf;
label2, P_node, mult(2), y_leaf, register_leaf;
label3, P_node, add(2), 2_leaf, register_leaf;
label4, P_node, move(2), register_leaf, x_leaf;
x_leaf, P_node, leaf(1), memory, 'x';
y_leaf, P_node, leaf(1), memory, 'y';
2_leaf, P_node, leaf(1), int, '2';
register_leaf, P_node, leaf(1), register, 'r6';
```

Within this exemplary third pass code, the operands "memory", "register", and "INT" are assumed to be predefined and to denote a memory location, a register, and a constant, respectively.

Figure 5:
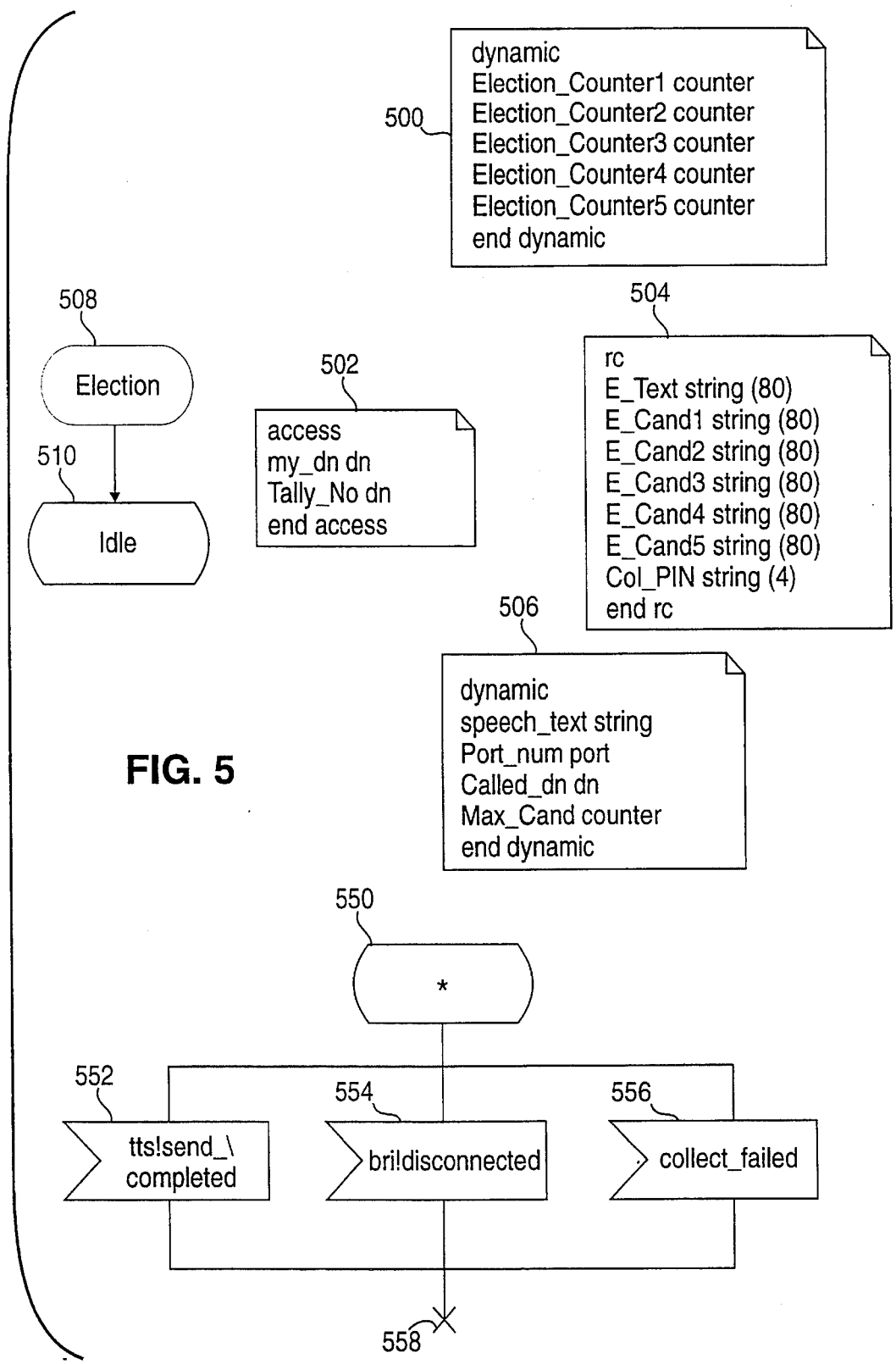

The present invention facilitates the implementation of telecommunication services in a variety of different EEs, without designing a separate interface with each EE. A complete SDL/GR notation for an exemplary televoting service, which enables voters to cast their votes over a telecommunication system, is shown in FIGS. 5 through 8. The televoting service may be implemented in, for example, a telephone switching system. The service itself, however, is generally first developed in a graphical notation, such as SDL/GR. In general, the SDL notation includes a number of different interrelated symbols which describe the service in terms of logic flow diagrams. The symbols are arranged in a particular order, or precedence, which determines the scope of a symbol. A given symbol located closer to the upper left hand corner of an editing screen in the graphical editor has a higher precedence than other symbols located below or to the right of the given symbol. For example, the DECLARATION symbol 500 of FIG. 5 represents global declarations in this example, since the symbol is located above any symbols corresponding to, for example, the FSM defined by START symbol 508. The symbol 508 has a higher precedence than the symbol 506, and therefore the scope of the declarations in symbol 506 is the FSM corresponding to START symbol 508.

Each of the symbols within the SDL/GR notation typically contains text. The text within a symbol may correspond to, for example, an identifier for a state, an event or an FSM, a data declaration, a statement in the SLL syntax, or a comment. To accommodate long lines of text which would otherwise not fit within a symbol, the character "\" is used to indicate a line continuation. The line continuation character "\" may be deleted when, for example, the SDL/GR is translated to an SLL for execution in a particular EE. In this example, as in FIG. 4, the symbols contain text corresponding to an SLL syntax. The particular syntax used may, of course, vary from application to application.

FIG. 5 includes several DECLARATION symbols 500 to 506 within the SDL/GR description of the televoting service. The DECLARATION symbol in the SDL/GR corresponds to the symbols 500 to 506, and is used for data declarations and initializations within a SDL/GR program. For example, the symbol 500 declares a group of dynamic variables corresponding to election counters for each of five different candidates in this televoting example, while the symbol 504 declares the names of the five candidates as character strings with a length of 80 characters each. The symbol 508 in FIG. 5 is known as a START symbol in SDL/GR notation, while the symbol 510 is a STATE symbol. A START symbol is typically used to define an FSM, and connects to a STATE symbol which explicitly specifies the initial state of the FSM. The text within the START and STATE symbols thus specifies the name of the FSM and its initial state, respectively. Because the scope of a FSM is the entire SDL/GR program in which it is defined, the FSM therefore must be unique within the SDL/GR program. However, because the scope of a STATE is the FSM which it is associated with, the STATE names may be duplicated within the SDL/GR program. The symbols 508 and 510 define a FSM named "Election" which has an initial state of "Idle". FIG. 5 also shows a default STATE symbol 550 which defines a set of INPUT symbols 552, 554 and 556 corresponding to default event handlers. The default event handlers receive various system inputs, such as a disconnect indicator, and terminate the operation of the FSM, as indicated by the STOP symbol 558. The default event handlers provide a means for terminating the FSM processing when, for example, a call is terminated by the user.

Figure 6A:
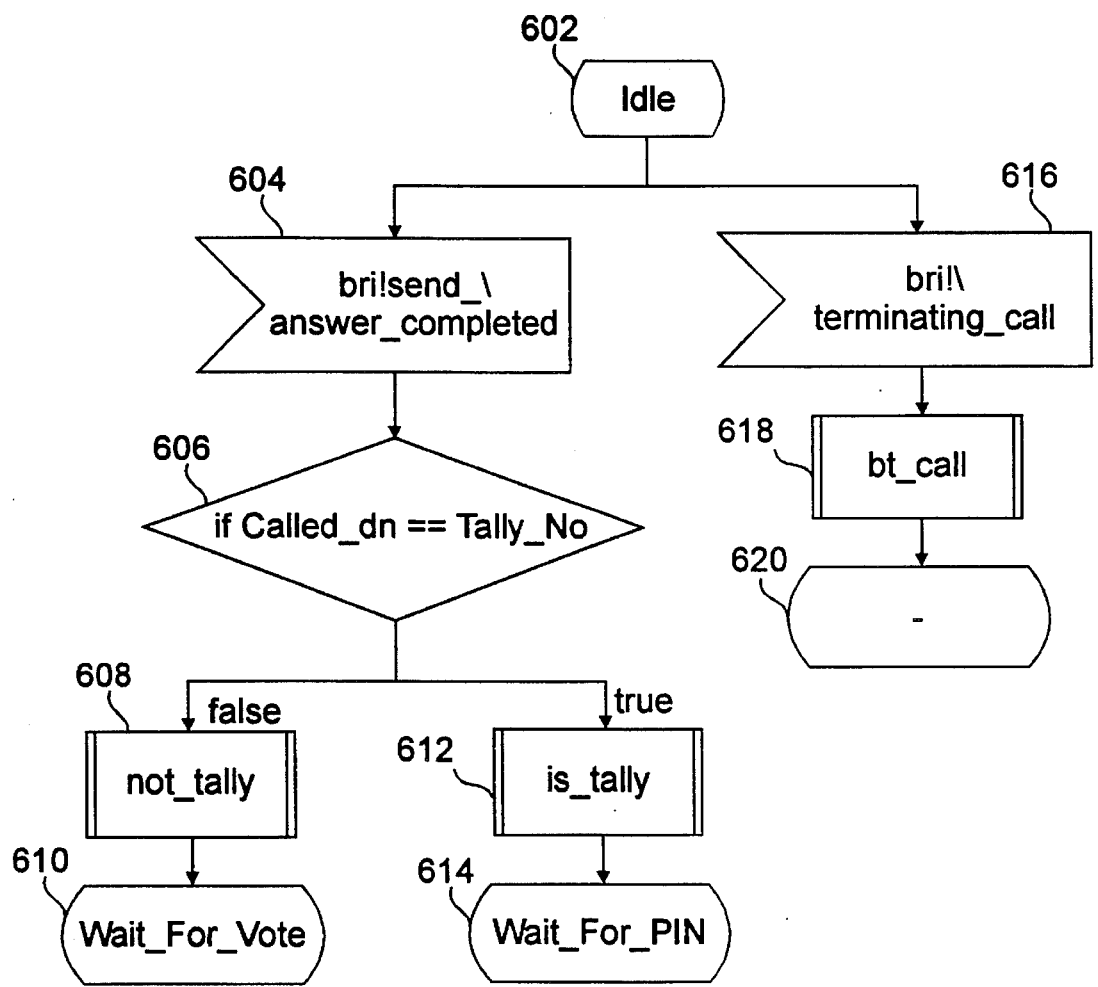

FIG. 6(a) shows the processing steps which follow the "Idle" state. From the STATE symbol 602, the FSM may receive one of two different inputs. The symbol 604 in FIG. 6(a) is an INPUT symbol in the SDL/GR notation, indicating an event. The text within the INPUT symbol specifies the name of a corresponding event handler. Because an event handler is always associated with a state, an INPUT symbol such as 604 must be preceded by a STATE symbol. If the preceding state is a default state, indicated by a STATE symbol containing an asterisk, the event handler is referred to as a default event handler. The INPUT symbol 604 indicates that an event handler "bri!send_answer_completed" receives one possible input for initiating the televoting service.

Figures 7A, 7B:
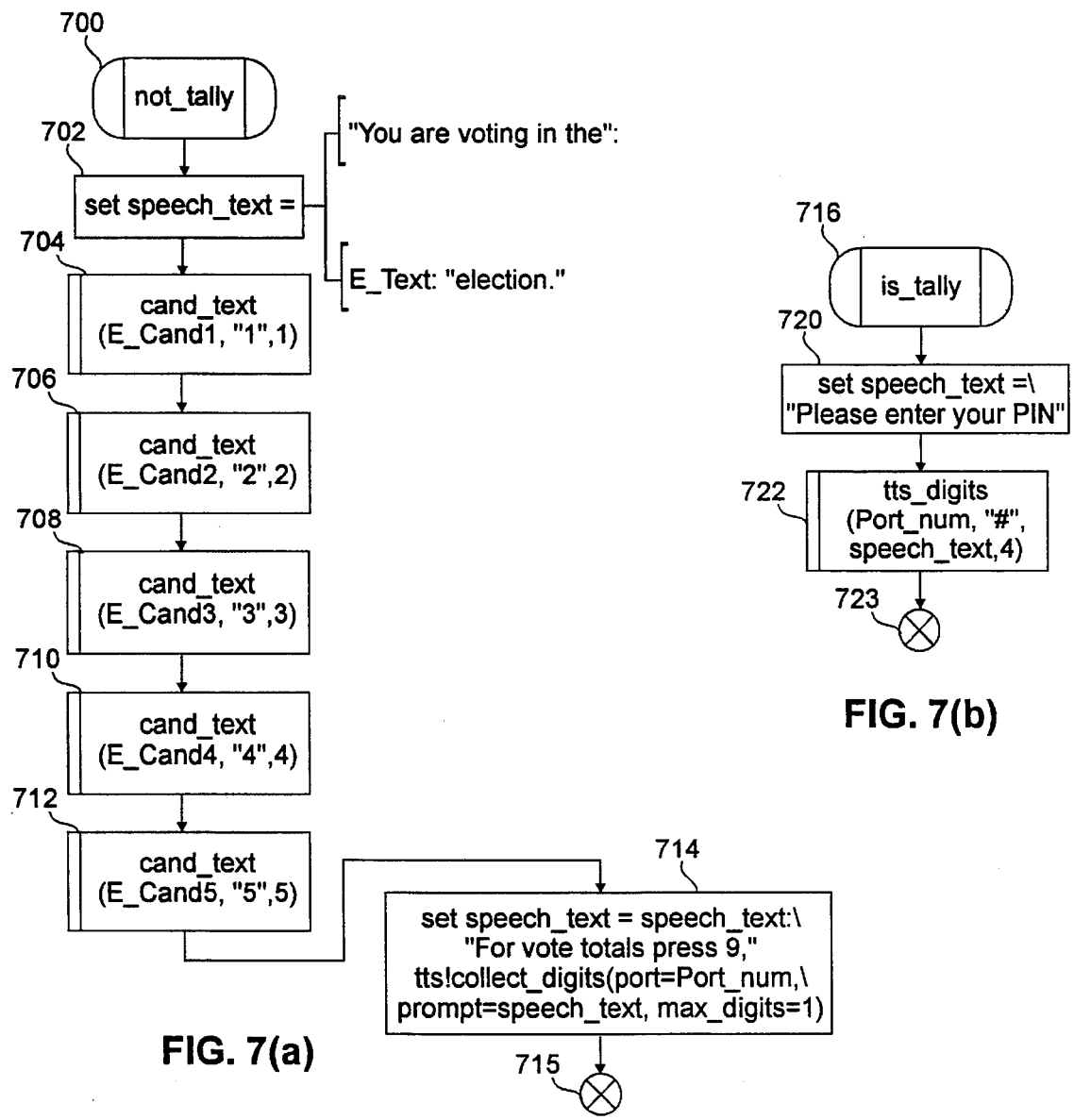
Figure 7C:
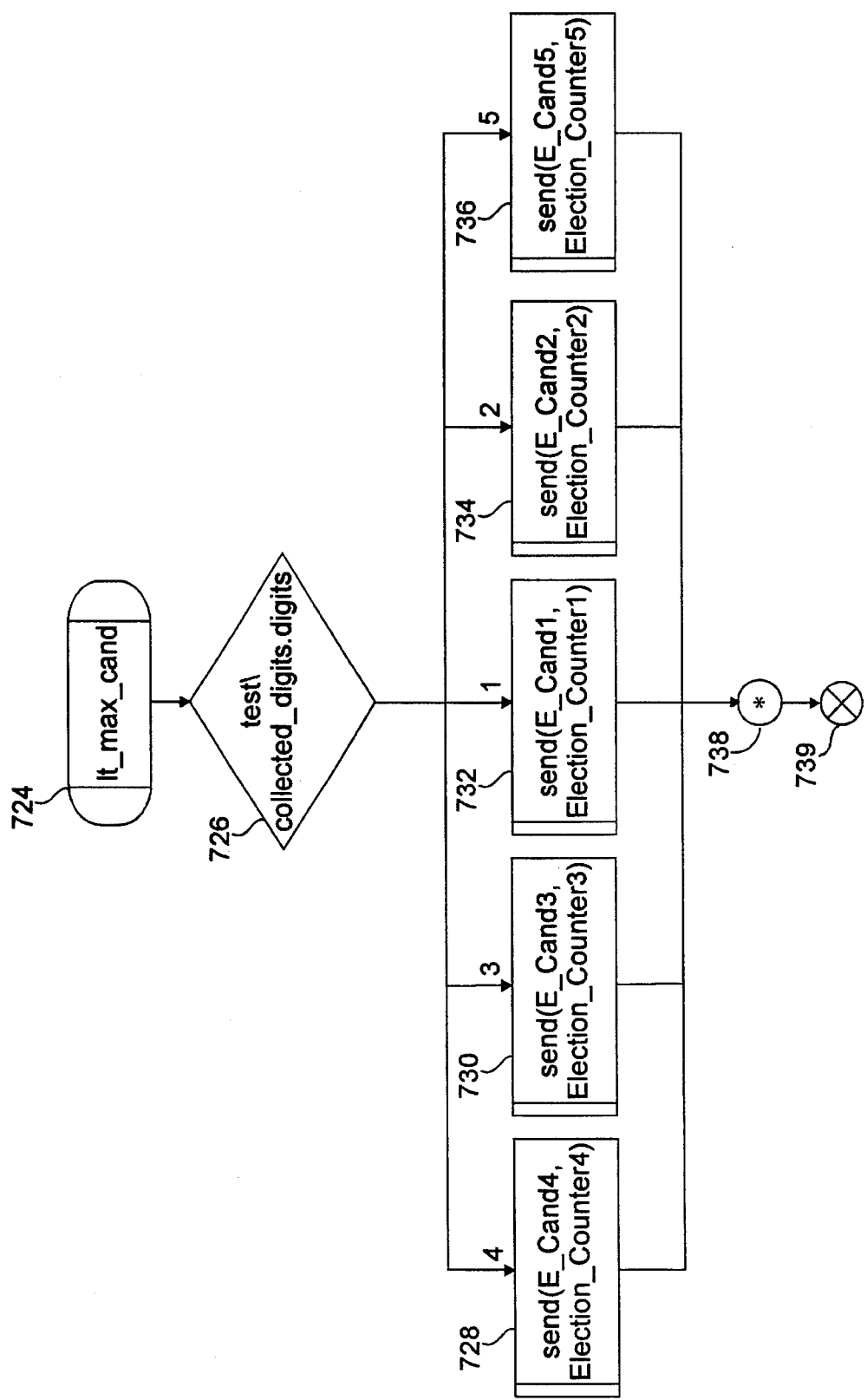

The symbol 606 in FIG. 6(a) is a DECISION symbol in SDL/GR notation, and may represent an "if" or a "test" compound statement. In the case of an "if" compound statement, the text within the symbol includes the keyword "if" and a boolean expression, and there are at most two branches emanating from the DECISION symbol. The symbol 606 is of the "if" type. Alternatively, in the case of a "test" compound statement, the text within the symbol includes the keyword "test" and an expression, and any number of branches may emanate from the symbol. The DECISION symbol 726 in FIG. 7(c) is of the "test" type. The DECISION symbol 606 in FIG. 6(a) indicates that upon receipt of an input of the type specified in INPUT symbol 604, a decision is made based upon the variable "Called_dn" which refers to a dialed number entered by the user. If "Called_dn" is not equivalent to "Tally_No", a number which the user may dial to receive total vote count information, the PROCEDURE CALL symbol 608 is accessed and a procedure "not_tally" is called. After the called procedure is executed, the FSM then goes to the state "Wait_For_Vote" as shown by STATE symbol 610 Alternatively, if the tally number has been called by the user, a procedure "is_tally" is called, as indicated in PROCEDURE CALL symbol 612, and the FSM then goes to state "Wait_For_PIN" as shown by STATE symbol 614. The procedures "not_tally" and "is_tally" are shown in FIGS. 7(a) and 7(b), respectively. From the initial "Idle" state, the "Election" FSM may also receive an input "bri!terminating_call" as shown by INPUT symbol 616. If this input is received, the PROCEDURE CALL symbol 618 directs the FSM to access a procedure "bt_call". After executing the procedure, the FSM returns to the current state, as indicated by the "—" character within the STATE symbol 620. The dash is used in the SDL/GR notation as a shorthand for the current state of the FSM. The procedure "bt_call" is shown in FIG. 7(e).

Figure 6B:
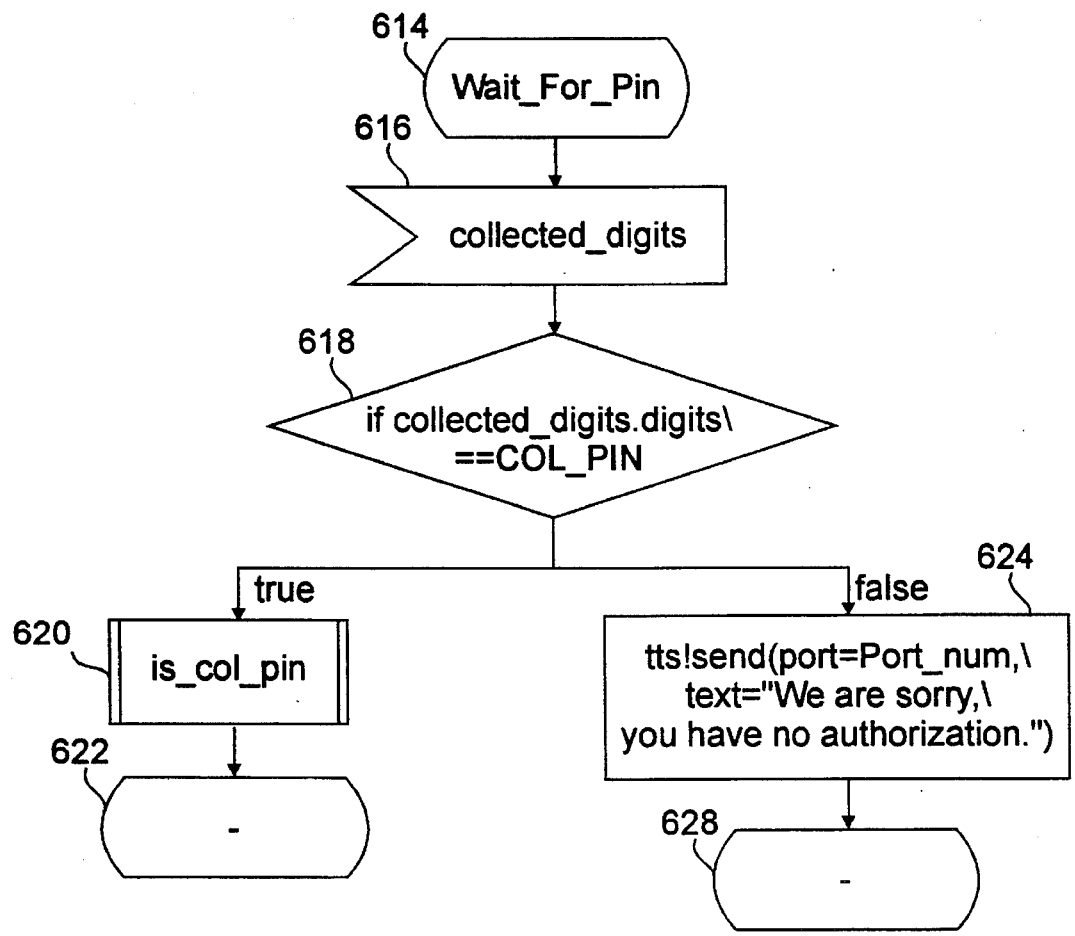

FIG. 6(b) shows the processing steps which follow the "Wait_For_PIN" state shown in STATE symbol 614. An INPUT symbol 616 receives digits entered by the service user. The digits may be entered using, for example, dual-tone multiple-frequency (DTMF) commands from a touch-tone telephone. The DECISION symbol 618 indicates whether the received digits match, for example, a list of Personal Identification Numbers (PINs) authorized to receive information regarding the total vote count. If so, the PROCEDURE CALL symbol 620 indicates that a procedure "is_col_pin" is executed, and then the FSM returns to the current state, as indicated in STATE symbol 622. Alternatively, if the received digits do not correspond to an authorized PIN, the user receives a message, as shown in TASK symbol 624, that authorization to receive total vote count information has been denied. A TASK symbol in the SDL/GR notation is used to indicate operations of an event handler in the form of, for example, SLL statements. The FSM then returns to the current state, as shown in STATE symbol 628.

Figure 6C:
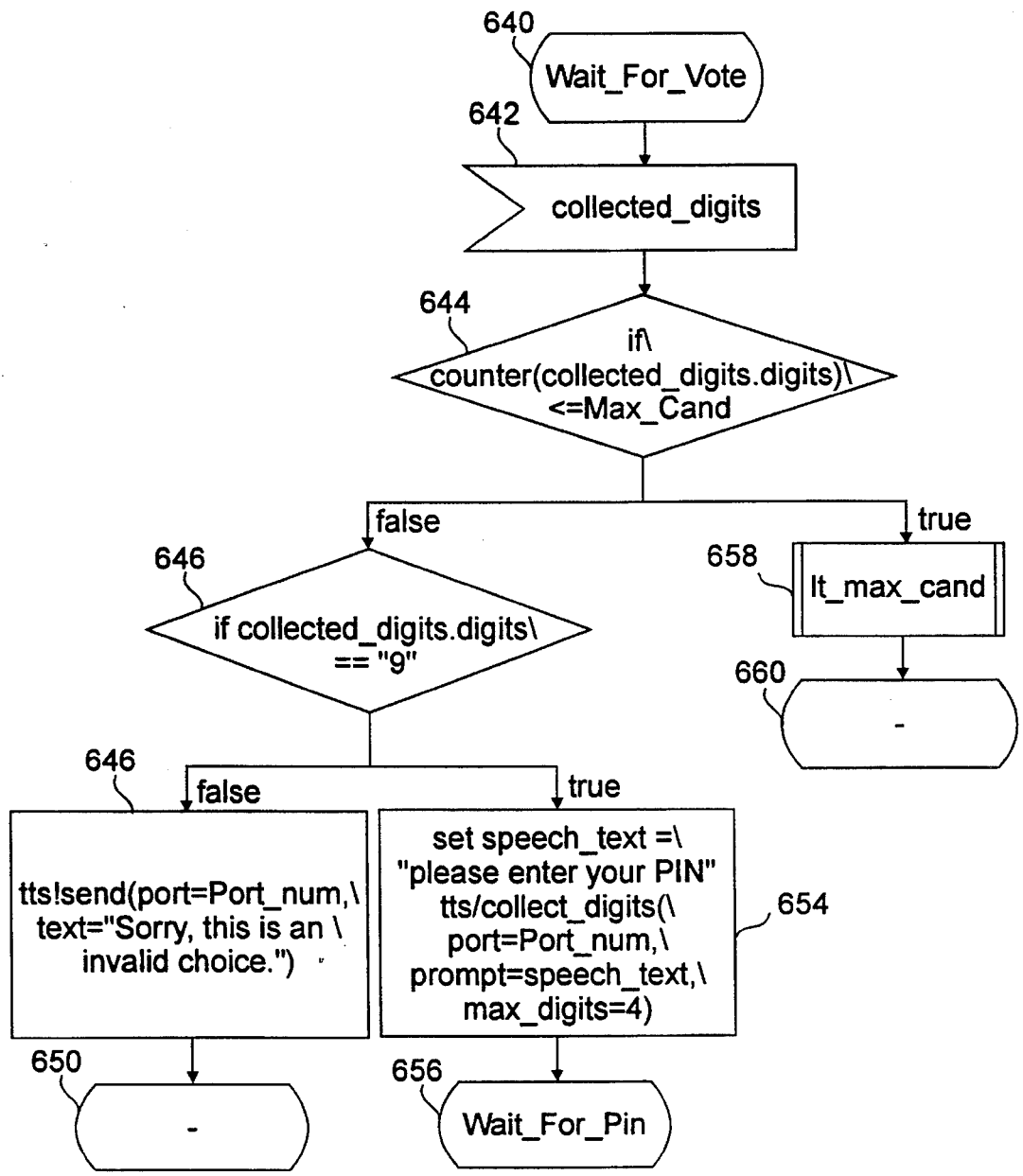

FIG. 6(c) shows the symbols accessed via the "Wait_For_Vote" state corresponding to the STATE symbol 610 of FIG. 6(a). An INPUT symbol 642 indicates that an input "collected_digits" may be received from the state "Wait_For_Vote" shown in STATE symbol 640. The input may correspond to a selection of a particular candidate by a system user who may enter from a telephone, for example, several digits in the form of DTMF commands. If this input is received, the DECISION symbol 644 indicates that a digit counter is checked against the variable "Max_Cand", which corresponds to the highest possible candidate selection number in a given election. If the digit counter is greater than "Max_Cand", the input does not correspond to an available candidate selection, and DECISION symbol 646 indicates that another decision is made as to whether the digit "nine" was entered. In this example, the digit "nine" indicates that the user is attempting to access total vote count information.

If the digit "nine" was not entered, a TASK symbol 648 provides an announcement to the user that, based upon the number of digits entered, an improper selection has been made. The FSM then returns to the current state, as indicted by the DECISION symbol 630. Alternatively, if the digit "nine" has been entered, the TASK symbol 654 indicates that the user should be prompted for a PIN in order to verify, for example, that the user is authorized to receive a total vote count. After the user is prompted to enter the PIN, the FSM enters the state "Wait_For_PIN" as shown in STATE symbol 656. If the collected digits counter indicates that one of the available candidate selection digits has been entered by the user, PROCEDURE CALL symbol 658 indicates that a procedure "lt_max_cand", shown in FIG. 7(c), should be executed. After the procedure is executed, the FSM returns to the current state, as shown in STATE symbol 660.

Figure 8A:
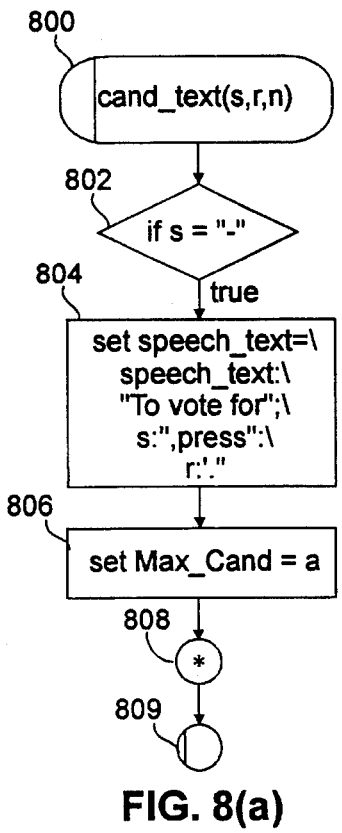
Figure 8B:
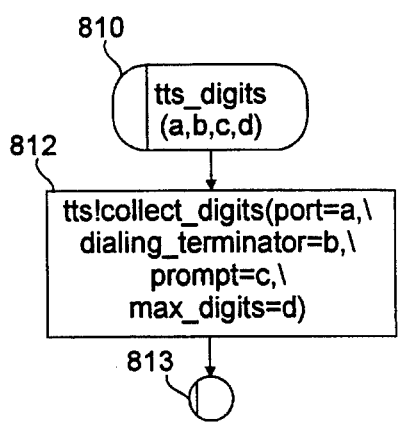

FIG. 7 shows in greater detail the procedures which are called within the exemplary televoting SDL/GR notation. The symbols 700, 716, 724, 740 and 756 correspond to PROCEDURE START symbols, while the symbols 715, 723,739, 755 and 759 correspond to PROCEDURE STOP symbols. FIG. 7(a) shows the processing steps of the procedure "not_tally" called from PROCEDURE CALL symbol 608 in FIG. 6(a). The TASK symbol 702 may, for example, direct a text-to-speech convertor to provide a message to the user. The message is shown to the right of the TASK symbol using a bracket which corresponds to a COMMENT symbol in SDL/GR notation. The exemplary message indicates to the user the name of the election in which they are voting. Several different MACRO CALL symbols 704 to 712 are then accessed sequentially, in order to identify the five candidates in the election. The macro corresponding to each of the symbols 704 to 712 is shown in FIG. 8(a), and directs the user to enter the appropriate digit in order to vote for a particular candidate. A TASK symbol 714 may then prompt the user to enter a particular digit, "nine" in this example, to attempt to access the current total vote count for each of the candidates.

Figure 8C:
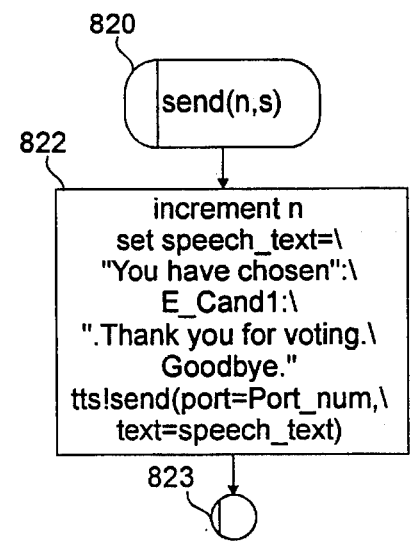
Figure 8D:
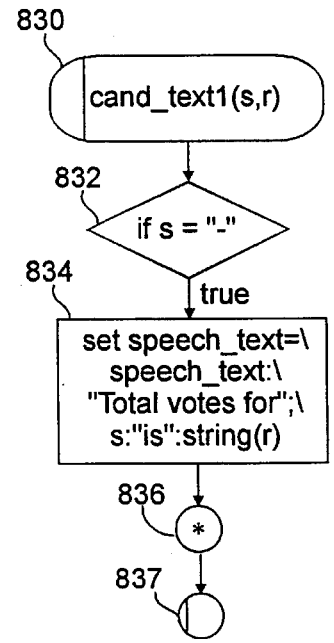

FIG. 7(b) shows the steps in the procedure "is_tally" called from the PROCEDURE CALL symbol 612 of FIG. 6(a). The TASK symbol 720 prompts the user to enter a PIN, and then a MACRO CALL symbol 722 calls a macro "tts_digits" shown in FIG. 8(b). FIG. 7(c) shows the steps in the procedure "lt_max_cand" called from PROCEDURE CALL 658 in FIG. 6(c). A DECISION symbol 726 indicates that a test is performed on the collected digits to determine which of the available candidates the user has selected. For example, by entering "1", the user can vote for the first candidate. The MACRO CALL symbols 728 to 736 then indicate that a macro "send(n,s)", shown in FIG. 8(c), is called FIG. 7(d) shows the steps of the procedure "is_col_pin" called from the PROCEDURE CALL symbol 620 of FIG. 6(b), indicating that the user is authorized to receive a total vote count. A TASK symbol 702 provides a message to the user that the present totals for each candidate will be given. In MACRO CALL symbols 744 to 754 a macro "cand_text1" is called to provide the user with the appropriate total for each of the candidates. The macro "cand_text1" is shown in greater detail in FIG. 8(d). FIG. 7(e) shows the steps in the procedure "bt_call" called from PROCEDURE CALL symbol 618 of FIG. 6(a).

FIG. 8 shows in greater detail the processing steps within each of the macros called in the televoting SDL/GR program. FIGS. 8(a) through 8(d) show additional detail of the macros "cand_text(s,r,n)", "tts_digits", "send(n s)" and "cand_text1(s,r)", respectively. The symbols 800, 810, 820 and 830 correspond to MACRO START symbols, while the symbols 809, 813, 823 and 837 correspond to MACRO STOP symbols. The symbols 808 and 836 correspond to out connectors, which indicate the end of the decision operations corresponding to DECISION symbols 802 and 832, respectively.

It should be noted that the above-described exemplary televoting SDL/GR notation, and the syntax used for the symbol text, may vary considerably from application to application. However, the above televoting example serves to illustrate the advantages provided by the interface of the present invention. A service application such as televoting, developed in a graphical editor such as SDL/GR, may now be used in any of a number of different EEs, as a result of the application-oriented interface provided herein.

A set of first pass code generated in accordance with the present invention for the televoting service of FIGS. 5 through 8 is shown below:

```
P1s1,P_node,B_TEXT_G(1),P1s5,dynamic';
P1s5,P_node,B_TEXT_G(1),NULL,rc';
P1s2,P_node,B_START(2),P1s4,P1s3,'election';
P1s4,P_node,B_TEXT_F(1),P1s12,access';
P1s12,P_node,B_TEXT_F(1),NULL,dynamic';
P1s3,P_node,B_STATE(0),'Idle';
P1s6,P_node,B_STATE(3),P1s9,P1s11,P1s7,'*';
P1s9,P_node,B_INPUT(1),P1s17,completed';
P1s11,P_node,B_INPUT(1),P1s17,'bri!disconnected';
P1s7,P_node,B_INPUT(1),P1s17,'collect_failed';
P1s17,P_node,B_STOP(0),'';
P2s1,P_node,B_STATE(2),P2s6,P2s2,'Idle';
P2s6,P_node,B_INPUT(1),P2s13,answer_completed';
P2s2,P_node,B_INPUT(1),P2s4,terminating_call';
P2s13,P_node,B_DECISION(4),P2s14,P2s13T1,P2s16,P2s13T2,Tally_No';
P2s13T2,P_node,B_TEXT(0),'false';
P2s13T1,P_node,B_TEXT(0),'true';
P2s4,P_node,B_P_CALL(1),P2s5,'bt_call';
P2s5,P_node,B_STATE(0),'-';
P2s16,P_node,B_P_CALL(1),P2s17,'not_tally';
P2s14,P_node,B_P_CALL(1),P2s15,'is_tally';
P2s17,P_node,B_STATE(0),'Wait_For_Vote';
P2s15,P_node,B_STATE(0),'Wait_For_PIN';
P3s1,P_node,B_STATE(1),P3s2,'Wait_For_PIN';
P3s2,P_node,B_INPUT(1),P3s3,'collected_digits';
P3s3,P_node,B_DECISION(4),P3s4,P3s3T3,P3s7,P3s3T4,COL_PIN';
P3s3T3,P_node,B_TEXT(0),'true';
P3s3T4,P_node,B_TEXT(0),'false';
P3s7,P_node,B_TASK(1),P3s6,'tts!send(port=Port_num,text="Sorry, no authorization.")';
P3s4,P_node,B_P_CALL(1),P3s5,'is_col_pin';
P3s5,P_node,B_STATE(0),'-'
P3s6,P_node,B_STATE(0),'-'
P4s1,P_node,B_STATE(1),P4s2,'Wait_for_Vote';
P4s2,P_node,B_INPUT(1),P4s3,'collected_digits';
P4s3,P_node,B_DECISION(4),P4s6,P4s3T7,P4s9,P4s3T8,Max_Cand';
P4s3T8,P_node,B_TEXT(0),'true';
P4s3T7,P_node,B_TEXT(0),'false';
P4s6,P_node,B_DECISION(4),P4s4,P4s6T5,P4s7,P4s6T6,"9"';
P4s6T6,P_node,B_TEXT(0),'false';
P4s6T5,P_node,B_TEXT(0),'true';
P4s9,P_node,B_P_CALL(1),P4s10,'lt_max_cand';
P4s10,P_node,B_STATE(0),'-';
P4s7,P_node,B_TASK(1),P4s8,'tts!send(port=Port_num,text="Sorry, incorrect choice.")';
P4s4,P_node,B_TASK(1),P4s5,port=Port_num,prompt=speech_text,max_digits=4)';
P4s5,P_node,B_STATE(0),'Wait_For_Pin';
P4s8,P_node,B_STATE(0),'-';
P5s14,P_node,B_M_START(1),P5s15,'cand_text(s,r,n)';
P5s8,P_node,B_M_START(1),P5s9,'tts_digits(a,b,c,d)';
P5s25,P_node,B_M_START(1),P5s26,'cand_text1(s,r)';
P5s15,P_node,B_DECISION(2),P5s16,P5s15T9,"-"';
P5s9,P_node,B_TASK(1),P5s13,'tts!collect_digits(port=a,dialing_terminator=b,prompt=c,max_digits=4);
P5s15T9,P_node,B_TEXT(0),'true';
P5s16,P_node,B_TASK(1),P5s20,",".";
P5s26,P_node,B_DECISION(2),P5s27,P5s26T10,"-"';
P5s26T10,P_node,B_TEXT(0),'true';
P5s13,P_node,B_M_STOP(0),'';
P5s27,P_node,B_TASK(1),P5s29,string(r)';
P5s20,P_node,B_TASK(1),P5s23,n';
P5s1,P_node,B_P_START(1),P5s3,'is_tally';
P5s29,P_node,B_LABEL(1),P5s30,'*';
P5s23,P_node,B_LABEL(1),P5s24,'*';
P5s30,P_node,B_M_STOP(0),'';
P5s3,P_node,B_TASK(1),P5s5,PIN"';
P5s24,P_node,B_M_STOP(0),'';
P5s49,P_node,B_P_START(1),P5s50,'bt_call';
P5s5,P_node,B_M_CALL(1),P5s7,(Port_num,"#",speech_text,4)';
P5s50,P_node,B_TASK(1),P5s51,bri!send_answer(port=Port_num)';
P5s7,P_node,B_P_STOP(0),'';
P5s51,P_node,B_P_STOP(0),;
P6s1,P_node,B_P_START(1), r ' ' G 'ly ;
P6s3,P_node,B_TEXT_EXP(0),":';
P6s2,P_node,B_TASK(3),P6s5,P6s3,P6s4,';
P6s4,P_node,B_TEXT_EXP(0),election.'';
P6s5,P_node,B_M_CALL(1),P6s6, (E_Cand1,"1",1)'; P6s6,P_node,B_M_CALL(1),P6s8, (E_Cand2,"2",2)';
P6s8,P_node,B_M_CALL(1),P6s9, (E_Cand3,"3",3)';
P6s9,P_node,B_M_CALL(1),P6s10, (E_Cand4,"4",4)';
P6s11,P_node,B_TASK(1),P6s12,tts!collect_digits\'J'J1'_=r'J1'_11U1')1')1=',111C1X._U1y11'
P6s10,P_node,B_M_CALL(1),P6s11, (E_Cand5,"5",5);
P6s12,P_node,B_P_STOP(0),'';
P7s12,P_node,B_P_START(1),P7s13,'is_col_pin';
P7s13,P_node,B_TASK(1),P7s16,are,'';
P7s16,P_node,B_M_CALL(1),P7s23, (E_Cand1,Election_Counter1);
P7s23,P_node,B_M_CALL(1),P7s24, (E_Cand2,Election_Counter2);
P7s24,P_node,B_M_CALL(1),P7s25, (E_Cand3,Election_Counter3);
P7s25,P_node,B_M_CALL(1),P7s26, (E_Cand4,Election_Counter4);
P7s26,P_node,B_M_CALL(1),P7s21, (E_Cand5,Election_Counter5);
P7s21,P_node,B_TASK(1);
P7s22,'tts!send(port=Port_num,text=speech_text)';
P7s22,P_node,B_P_STOP(0),'';
P8s6,P_node,B_P_START(1),P8s2, 'lt_max_cand';
P8s2,P_node,B_DECISION(10),P8s3,P8s2T11,P8s4,P8s2T12,P8s5,P8s2T13,P8s7, P8s2T14,P8s8,P8s2T15;
P8s2T15,P_node,B_TEXT(0),'5';
P8s2T14,P_node,B_TEXT(0),'4';
P8s2T13, P_node,B_TEXT(0),'3';
P8s2T12,P_node,B_TEXT(0),'2';
P8s2T11,P_node,B_TEXT(0),'1';
P8s7,P_node,B_M_CALL(1),P8s9,'send(E_Cand4,Election_
```

```
Counter4)';
P8s5,P_node,B_M_CALL(1),P8s9,'send(E_Cand3,Election_
Counter3)';
P8s3,P_node,B_M_CALL(1),P8s9,'send(E_Cand1,Election_
Counter1)';
P8s4,P_node,B_M_CALL(1),P8s9,'send(E_Cand2,Election_
Counter2)';
P8s8,P_node,B_M_CALL(1),P8s9,'send(E_Cand5,Election_
Counter5)';
P8s9,P_node,B_LABEL(1),P8s10,'*';
P8s10,P_node,B_P_STOP(0);
P8s11,P_node,B_M_START(1), 'S1G, sencl'n,s);
P8s12,P_node,B_TASK(1),P8s13,tts!send(port=Port_num,text=
speech_text)';
P8s13,P_node,B_M_STOP(0),'';
```

An exemplary set of common intermediate AOPL code for the exemplary televoting service application is shown below:

```
@94840,P_node,S11PROG(2),@109072,@109296;t'7
@109072,P_node,SEQUENCE(2),@109104,@109240;
@109104,P_node,SIGNATURE(0),dynamic';
@109240,P_node,SIGNATURE(0),rc';
@109296,P_node,SEQUENCE(1),@109328;
@109328,P_node,S11FSM(5),@109360,@109488,@109552,@109728,
@110320;
@109360,P_node,LEAF(1),$fsm,'election';
@109488,P_node,STATE(2),@109520,@110352;
@109520,P_node,LEAF(1),$state,'Idle';
@110352,P_node,SEQUENCE(2),@110384,@79976;
@110384,P_node,EVENT(2),@110416,@110472;
@110416,P_node,LEAF(1),$event,'bri!send_answer_completed';
@110472,P_node,SEQUENCE(1),@110504;
@110504,P_node,IF(4),@110536,@110592,NULL,@112312;
@110536,P_node,SIGNATURE(0),Tally_No';
@110592,P_node,SEQUENCE(2),@110696,@112280;
@110696,P_node,SEQUENCE(2),@110728,@111944;
@110728,P_node,SIGNATURE(0),PIN'';
@111944,P_node,SEQUENCE(1),@111976;
@111976,P_node,SIGNATURE(0),'tts!collect_digits(port=
Port_num,dialing_terminator="#",prompt=speech_text);
@112280,P_node,NEXTSTATE(1),@112224;
@112224,P_node,STATE(2),@112136,NULL;
@112136,P_node,LEAF(1),$state,'Wait_For_PIN';
@112312,P_node,SEQUENCE(2),@112416,@79912;
@112416,P_node,SEQUENCE(7),@112448,@76688,@77304,
@77968,@78600,@79232,@79680;
@112448,P_node,SIGNATURE(0),'election.'';
@76688,P_node,SEQUENCE(1),@76720;
@76720,P_node,IF(4),@76752,@76832,NULL,NULL;
@76752,P_node,SIGNATURE(0),"-'';
@76832,P_node,SEQUENCE(2),@76864,@77016;
@76864,P_node,SIGNATURE(0),",".'';
@77016,P_node,SIGNATURE(0),1';
@77304,P_node,SEQUENCE(1),@77336;
@77336,P_node,IF(4),@77368,@77448,NULL,NULL;
@77368,P_node,SIGNATURE(0),"-'';
@77448,P_node,SEQUENCE(2),@77480,@77632;
@77480,P_node,SIGNATURE(0),",".'';
@77632,P_node,SIGNATURE(0),2';
@77968,P_node,SEQUENCE(1),@78000;
@78000,P_node,IF(4),@78032,@78112,NULL,NULL;
@78032,P_node,SIGNATURE(0),"-'';
@78112,P_node,SEQUENCE(2),@78144,@78296;
@78144,P_node,SIGNATURE(0),",".'';
@78296,P_node,SIGNATURE(0),3';
@78600,P_node,SEQUENCE(1),@78632;
@78632,P_node,IF(4),@78664,@78744,NULL,NULL;
@78664,P_node,SIGNATURE(0),"-'';
@78744,P_node,SEQUENCE(2),@78776,@78928;
@78776,P_node,SIGNATURE(0),",".'';
@78928,P_node,SIGNATURE(0),4';
@79232,P_node,SEQUENCE(1),@79264;
@79264,P_node,IF(4),@79296,@79376,NULL,NULL;
@79296,P_node,SIGNATURE(0),"-'';
@79376,P_node,SEQUENCE(2),@79408,@79560;
@79408,P_node,SIGNATURE(0),",".'';
@79560,P_node,SIGNATURE(0),5';
@79680,P_node,SIGNATURE(0),'tts!collect_digits(port=
Port_num,prompt=speech_text,max_digits=1);
@79912,P_node,NEXTSTATE(1),@79856;
@79856,P_node,STATE(2),@79768,@113360;
@79768,P_node,LEAF(1),$state,'Wait_For_Vote';
@113360,P_node,SEQUENCE(1),@113392;
@113392,P_node,EVENT(2),@113424,@113480;
@113424,P_node,LEAF(1),$event,'collected_digits';
@113480,P_node,SEQUENCE(1),@113512;
@113512,P_node,IF(4),@113544,@113600,NULL,@117456;
@113544,P_node,SIGNATURE(0),Max_Cand';
@113600,P_node,SEQUENCE(1),@113704;
@113704,P_node,SEQUENCE(1),@113736;
@113736,P_node,TEST(3),@113768,@113800,NULL;
@113768,P_node,SIGNATURE(0),collected_digits.digits';
@113800,P_node,CASE(10),@113864,@113920,@115496,@115584,
@115992,@116048,@116456,@116544,@113864,P_node,
SIGNATURE(0),'1';
@113920,P_node,SEQUENCE(1),@115248;
@115248,P_node,SEQUENCE(1),@115280;
@115280,P_node,SIGNATURE(0),tts!send(port=Port_num,text=
speech_text);
@115496,P_node,SIGNATURE(0),'2';
@115584,P_node,SEQUENCE(1),@115744;
@115744,P_node,SEQUENCE(1),@115776;
@115776,P_node,SIGNATURE(0),tts!send(port=Port_num,text=
speech_text);
@115992,P_node,SIGNATURE(0),'3';
@116048,P_node,SEQUENCE(1),@116208;
@116208,P_node,SEQUENCE(1),@116240;
@116240,P_node,SIGNATURE(0),tts!send(port=Port_num,text=
speech_text);
@116456,P_node,SIGNATURE(0),'4';
@116544,P_node,SEQUENCE(1),@116704;
@116704,P_node,SEQUENCE(1),@116736;
@116736,P_node,SIGNATURE(0),tts!send(port=Port_num,text=
speech_text);
@116952,P_node,SIGNATURE(0),'5';
@117016,P_node,SEQUENCE(1),@117176;
@117176,P_node,SEQUENCE(1),@117208;
@117208,P_node,SIGNATURE(0),tts!send(port=Port_num,text=
speech_text)';
@117456,P_node,SEQUENCE(1),@117488;
@117488,P_node,IF(4),@117520,@117576,NULL,@117840;
@117520,P_node,SIGNATURE(0),"9"';
@117576,P_node,SEQUENCE(2),@117608,@117808;
@117608,P_node,SIGNATURE(0),tts!collect_digits(port=Port_
num,prompt=speech_text,max_digits=4
@117808,P_node,NEXTSTATE(1),@117752;
@117752,P_node,STATE(2),@117664,NULL;
@117664,P_node,LEAF(1),$state,'Wait_For_Pin';
@117840,P_node,SEQUENCE(1),@117872;
@117872,P_node,SIGNATURE(0),'tts!send(port=Port_num,
text="Sorry, incorrect choice.")';
@79976,P_node,EVENT(2),@80008,@80064;
@80008,P_node,LEAF(1),$event,'bri!terminating_call';
@80064,P_node,SEQUENCE(1),@80168;
@80168,P_node,SEQUENCE(1),@80200;
@80200,P_node,SIGNATURE(0),bri!send_answer(port=Port_
num)
@109552,P_node,SEQUENCE(2),@109584, 109640;
@109584,P_node,SIGNATURE(0),access';
@109640,P_node,SIGNATURE(0),dynamic';
@109728,P_node,SEQUENCE(3),@109760,@109936,@110112;
@109760,P_node,EVENT(2),@109792,@109848;
@109792,P_node,LEAF(1),$event,'tts!send_completed';
@109848,P_node,SEQUENCE(1),@109880;
@109880,P_node,SIGNATURE(0),'end_call';
@109936,P_node,EVENT(2),@109968,@110024;
@109968,P_node,LEAF(1),$event,'bri!disconnected';
@110024,P_node,SEQUENCE(1),@110056;
@110056,P_node,SIGNATURE(0),'end_call';
@110112,P_node,EVENT(2),@110144,@110200;
@110144,P_node,LEAF(1),$event,'collect_failed';
@110200,P_node,SEQUENCE(1),@110232;
@110232,P_node,SIGNATURE(0),'end_call';
@110320,P_node,SEQUENCE(3),@109488,@80320,@79856;
@80320,P_node,STATE(2),@80232,@80376;
@80232,P_node,LEAF(1),$state,'Wait_For_Pin';
```

```
@80376,P_node,SEQUENCE(1),@80408;
@80408,P_node,EVENT(2),@80440,@80496;
@80440,P_node,LEAF(1),$event,'collected_digits';
@80496,P_node,SEQUENCE(1),@80528;
@80528,P_node,IF(4),@80560,@80616,NULL,@113240;
@80560,P_node,SIGNATURE(0),CO1_PIN';
@80616,P_node,SEQUENCE(1),@80720;
@80720,P_node,SEQUENCE(7),@80752,@82088,@82584,@83128,
@83640,@84152,@113152;
@80752,P  node,SIGNATURE(0),are,'";
@82088,P_node,SEQUENCE(1),@82120;
@82120,P_node,IF(4),@82152,@82232,NULL,NULL;
@82152,P_node,SIGNATURE(0),"-'";
@82232,P_node,SEQUENCE(1),@82264;
@82264,P_node,SIGNATURE(0),string(Election_Counter1);
@82584,P_node,SEQUENCE(1),@82616;
@82616,P_node,IF(4),@82648,@82728,NULL,NULL;
@82648,P_node,SIGNATURE(0),"-'";
@82728,P_node,SEQUENCE(1),@82760;
@82760,P_node,SIGNATURE(0),string(Election_Counter2);
@83128,P_node,SEQUENCE(1),@83160;
@83160,P_node,IF(4),@83192,@83272,NULL,NULL;
@83192,P_node,SIGNATURE(0),"-'";
@83272,P_node,SEQUENCE(1),@83304;
@83304,P_node,SIGNATURE(0),string(Election_Counter3);
@83640,P_node,SEQUENCE(1),@83672;
@83672,P_node,IF(4),@83704,@83784,NULL,NULL;
@83704,P_node,SIGNATURE(0),"-'";
@83784,P_node,SEQUENCE(1),@83816;
@83816,P_node,SIGNATURE(0),string(Election_Counter4);
@84152,P_node,SEQUENCE(1),@84184;
@84184,P_node,IF(4),@84216,@112920,NULL,NULL;
@84216,P_node,SIGNATURE(0),"-'";
@112920,P_node,SEQUENCE(1),@112952;
@112952,P_node,SIGNATURE(0),string(Election_Counter5);
@113152,P_node,SIGNATURE(0),'tts!send(port=Port_num,
text=speech_text';
@113240,P_node,SEQUENCE(1),@113272;
@113272,P_node,SIGNATURE(0),'tts!send(port=Port_num,
text="Sorry, no authorization.")';
```

The above intermediate code for the televoting SDL/GR preserves sufficient detail of the original SDL/GR notation to, for example, allow efficient intermediate code optimization. In addition, the intermediate code may be executed in any of a number of different EEs by simply translating the intermediate code into an appropriate target code for a given EE. The basic structure of the original SDL/GR notation and the intermediate code need not be redesigned or otherwise altered to accommodate a particular type of EE.

Although the above detailed description has described the present invention primarily in terms of particular SCE and EE applications, it should be emphasized that the embodiments discussed are exemplary only. Many variations may be made in the arrangements shown, including, for example, the type of telecommunication system, the type of service creation and execution environments, the intermediate code syntax, and the number of passes used to translate and generate code within the system interface. These and other alternatives and variations will be readily apparent to those skilled in the art, and the present invention is therefore limited only by the appended claims.

We claim:

1. A method of interfacing telecommunication service creation environments and service execution environments, comprising the steps of:

identifying a number of selected service creation environments to be interfaced to at least one selected service execution environment;

defining a set of intermediate code operations suitable for representing telecommunication services developed in said selected service creation environments;

parsing output code from one of said selected service creation environments to form a representation of said service creation environment output code;

generating an intermediate code from said representation of said output code using said set of intermediate code operations, such that said intermediate code preserves sufficient structural information contained within said service creation environment output code to permit optimization of the intermediate code; and generating from said intermediate code a target code for said selected execution environment, such that said telecommunication service developed in said one of said selected service creation environments may be provided in said selected execution environment.

2. The method of claim 1 wherein said representation includes a parse tree and said step of generating an intermediate code further includes generating an intermediate code having a plurality of tuples, each of said tuples corresponding to a node of said output code parse tree.

3. The method of claim 3 wherein said service creation environment is a graphical editor which depicts said telecommunication service in a graphical notation using a plurality of interrelated symbols.

4. The method of claim 4 wherein each of said symbols used in said graphical editor corresponds to one of said tuples of said intermediate code.

5. The method of claim 4 wherein operands of an operator within said tuple indicate said interrelation of one of said symbols to other symbols in said graphical notation of said graphical editor.

6. The method of claim 3 wherein said graphical editor is a decision graph editor, in which said telecommunication service is represented in the form of a decision graph using a number of decision graph nodes interconnected by branches.

7. The method of claim 6 wherein one of said decision graph nodes is a percent node, and said tuple includes a pair of operands for each of said branches, indicating the likelihood of a particular decision graph node being connected to a particular branch.

8. The method of claim 6 wherein one of said decision graph nodes is a time node, and said tuple includes operands indicating a time after which a particular decision graph node will be connected to a particular branch.

9. The method of claim 4 wherein said graphical editor is a finite state machine editor.

10. The method of claim 1 wherein said representation includes a parse tree and said step of generating an intermediate code further includes generating an intermediate code capable of representing a statement node of said parse tree.

11. The method of claim 1 wherein said representation includes a parse tree and said step of generating an intermediate code further includes generating an intermediate code capable of representing a declaration node of said parse tree.

12. The method of claim 1 wherein said steps of parsing output code, generating an intermediate code, and generating a target code further include the steps of:

parsing said service creation environment output code to generate a first pass code;

generating a second pass code using said first pass code and second pass macros stored in a second pass database, said second pass code corresponding to said intermediate code; and generating a third pass code using said second pass code and third pass macros stored in a third pass database, said third pass code corresponding to said target code of said execution environment.

13. The method of claim 1 wherein said intermediate code is used to generate a service logic language code suitable for direct execution in said service execution environment.

14. The method of claim 1 wherein said telecommunication service is a televoting service.

15. The method of claim 14 wherein said televoting service is developed in a finite state machine editor using a service specification description language.

16. A telecommunication system interface between a number of selected service creation environments and at least one service execution environment, the interface comprising:

a parser for parsing output code from one of said service creation environments to form a representation of said service creation environment output code;

an intermediate code generator for generating an intermediate code from said representation of said output code, using a set of intermediate code operations suitable for representing telecommunication services developed in said selected service creation environments, such that said intermediate code preserves sufficient structural information contained within said service creation environment output code to permit optimization of the intermediate code; and a target code generator for generating from said intermediate code a target code for said execution environment, such that said telecommunication service developed in said service creation environment may be provided in said selected execution environment.

17. The interface of claim 16 wherein said representation includes a parse tree and said intermediate code includes a plurality of tuples, each of said tuples corresponding to a node of said parse tree.

18. The interface of claim 16 wherein said service creation environment is a graphical editor which depicts said telecommunication service in a graphical notation.

19. The interface of claim 16 wherein said execution environment is a telecommunication system service switching processor.

20. The interface of claim 16 wherein said execution environment is a telecommunication system service control processor.

* * * * *